US012725061B2

(12) United States Patent
Flöther et al.

(10) Patent No.: US 12,725,061 B2
(45) Date of Patent: Sep. 1, 2026

(54) OPTIMIZE QUANTUM-ENHANCED FEATURE GENERATION

(71) Applicant: International Business Machines Corporation, Armonk, NY (US)

(72) Inventors: Frederik Frank Flöther, Schlieren (CH); Abhijit Mitra, The Woodlands, TX (US)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 676 days.

(21) Appl. No.: 17/522,141

(22) Filed: Nov. 9, 2021

(65) Prior Publication Data

US 2023/0143072 A1 May 11, 2023

(51) Int. Cl.
*G06N 10/00* (2022.01)
*G06N 20/00* (2019.01)

(52) U.S. Cl.
CPC ............. *G06N 10/00* (2019.01); *G06N 20/00* (2019.01)

(58) Field of Classification Search
CPC ........ G06N 10/00; G06N 20/00; G06N 10/60; G06N 3/0475; G06N 10/20; G06N 3/045; G06N 3/092
See application file for complete search history.

(56) References Cited

U.S. PATENT DOCUMENTS 10,176,433 B2 * 1/2019 Hastings ................ G06N 10/60
10,592,216 B1 * 3/2020 Richardson ......... G06F 11/3466
11,030,548 B1 6/2021 Ding et al.
(Continued)

FOREIGN PATENT DOCUMENTS

CN 112381232 A 2/2021
WO 2020113339 6/2020

OTHER PUBLICATIONS

Herbert, Steven, and Akash Sengupta. "Using reinforcement learning to find efficient qubit routing policies for deployment in near-term quantum computers." arXiv preprint arXiv:1812.11619 (2018). (Year: 2018).*

(Continued)

*Primary Examiner* — Sehwan Kim
*Assistant Examiner* — Jasmine Thanh Thai
(74) *Attorney, Agent, or Firm* — Amin, Turocy & Watson, LLP

(57) ABSTRACT

Systems, computer-implemented methods, and computer program products to facilitate optimization of quantum-enhanced feature generation are provided. According to an embodiment, a system can comprise a processor that executes computer executable components stored in memory. The computer executable components comprise a selection component that selects a quantum circuit for mapping a set of classical features to a quantum feature space. The computer executable components further comprise an execution component that provides the quantum circuit for execution by a quantum computer or a quantum simulator to map the set of classical features and to produce quantum-enhanced features. The computer executable components further comprise a training component that assesses selection of quantum circuits and signals the selection component to select a new quantum circuit based on the assessment.

20 Claims, 10 Drawing Sheets

(56) References Cited

U.S. PATENT DOCUMENTS

| | | | | |
|---|---|---|---|---|
| 11,042,811 | B2 | 6/2021 | Rolfe et al. | |
| 11,281,988 | B1 * | 3/2022 | Naveh | G06N 10/20 |
| 2019/0121921 | A1 * | 4/2019 | Nam | G06F 30/327 |
| 2019/0205790 | A1 | 7/2019 | Dukatz et al. | |
| 2019/0378047 | A1 * | 12/2019 | Pistoia | G06N 10/60 |
| 2020/0118025 | A1 * | 4/2020 | Romero | G06N 3/045 |
| 2020/0265333 | A1 * | 8/2020 | Horesh | G06N 10/20 |
| 2020/0272926 | A1 * | 8/2020 | Chaplin | G06F 30/337 |
| 2020/0320437 | A1 * | 10/2020 | Gambetta | G06N 10/20 |
| 2020/0342344 | A1 * | 10/2020 | Gambetta | G06N 20/00 |
| 2020/0394550 | A1 * | 12/2020 | Fujii | G06N 20/00 |
| 2020/0410343 | A1 * | 12/2020 | Niu | G06N 10/60 |
| 2021/0049498 | A1 * | 2/2021 | Liu | G06N 7/01 |
| 2021/0182721 | A1 * | 6/2021 | Li | G06N 5/04 |
| 2021/0241150 | A1 * | 8/2021 | Tilly | G06N 3/045 |
| 2021/0256416 | A1 * | 8/2021 | Bocharov | G06N 10/20 |
| 2021/0334079 | A1 * | 10/2021 | Gambetta | G06F 8/36 |

OTHER PUBLICATIONS

Fosel, Thomas, et al. "Quantum circuit optimization with deep reinforcement learning." arXiv preprint arXiv:2103.07585 (2021). (Year: 2021).*

Weder B, Barzen J, Leymann F, Salm M. Automated quantum hardware selection for quantum workflows. Electronics. Apr. 20, 2021;10(8):984. (Year: 2021).*

Salm, Marie, et al. "The NISQ analyzer: automating the selection of quantum computers for quantum algorithms." Symposium and summer school on service-oriented computing. Cham: Springer International Publishing, 2020. (Year: 2020).*

Salm, Marie, et al. "About a criterion of successfully executing a circuit in the NISQ era: what wdâ$^a$ 1/d eff really means." Proceedings of the 1st ACM SIGSOFT International Workshop on Architectures and Paradigms for Engineering Quantum Software. 2020. (Year: 2020).*

Leymann, Frank, and Johanna Barzen. "The Bitter Truth About Quantum Algorithms in the NISQ Era." arXiv preprint arXiv:2006.02856 (2020). (Year: 2020).*

Weder B, Barzen J, Leymann F, Vietz D. Quantum Software Development Lifecycle. arXiv preprint arXiv:2106.09323. Jun. 17, 2021. (Year: 2021).*

Salm, M., Barzen, J., Leymann, F., Weder, B., Wild, K. (2021). Automating the Comparison of Quantum Compilers for Quantum Circuits. In: Barzen, J. (eds) Service-Oriented Computing. SummerSOC 2021. Communications in Computer and Information Science, vol. 1429. Springer, Cham (Year: 2021).*

Havlicek, V. et al. | "Supervised learning with quantum-enhanced feature spaces". Nature 567, 209-212 (2019). https://doi.org/10.1038/s41586-019-0980-2, 22 pages.

Dulac-Arnold, G. et al. | "Challenges of Real-World Reinforcement Learning". arXiv:1904.12901v1 [cs.LG] Apr. 29, 2019, 13 pages.

Henderson, M. et al. | "Quanvolutional neural networks: powering image recognition with quantum circuits." Quantum Machine Intelligence 2, No. 1 (2020): 1-9, 7 pages.

Khairy, S. et al. | "Reinforcement-learning-based variational quantum circuits optimization for combinatorial problems." arXiv preprint arXiv:1911.04574 (2019), 7 pages.

Pfau, D. et al. | "Connecting generative adversarial networks and actor-critic methods." arXiv preprint arXiv:1610.01945 (2016), 10 pages.

Hardy C. et al. | "Md-gan: Multi-discriminator generative adversarial networks for distributed datasets." In 2019 IEEE International parallel and distributed processing symposium (IPDPS), pp. 866-877. IEEE, 2019, 12 pages.

Schuld, M. et al. | "Effect of data encoding on the expressive power of variational quantum-machine-learning models." Physical Review A 103, No. 3 (2021): 032430, 16 pages.

Scheeloch, J. et al. | "Quantifying entanglement in a 68-billion-dimensional quantum state space." Nature communications 10, No. 1 (2019): 1-7, 7 pages.

Zhou et al. | "What limits the simulation of quantum computers?" Physical Review X 10, No. 4 (2020): 041038, 14 pages.

Wikipedia | "Reinforcement learning". Webpage https://en.wikipedia.org/wiki/Reinforcement_learning, last accessed Oct. 21, 2021.

Wikipedia | "Q-learning". Webpage https://en.wikipedia.org/wiki/Q-learning, last accessed Oct. 21, 2021.

IBM | "Trusted AI", webpage https://research.ibm.com/teams/trusted-ai, last accessed Oct. 21, 2021.

Tensorflow | "Parametrized Quantum Circuits for Reinforcement Learning". Webpage https://www.tensorflow.org/quantum/tutorials/quantum_reinforcement_learning, last accessed on Nov. 8, 2021, 23 pages.

Agnihotri, S. | "Quantum Machine Learning 102—QSVM Using Qiskit". Wepage, blog, https://medium.com/quantumcomputingindia/quantum-machine-learning-102-qsvm-using-qiskit-731956231a54, last accessed on Nov. 8, 2021, 10 pages.

* cited by examiner

OPTIMIZE QUANTUM-ENHANCED FEATURE GENERATION

BACKGROUND

The subject disclosure relates to quantum feature generation for machine learning, and more specifically, to optimization of quantum-enhanced feature generation.

SUMMARY

The following presents a summary to provide a basic understanding of one or more embodiments of the invention. This summary is not intended to identify key or critical elements, or delineate any scope of the particular embodiments or any scope of the claims. Its sole purpose is to present concepts in a simplified form as a prelude to the more detailed description that is presented later. In one or more embodiments described herein, systems, computer-implemented methods, and/or computer program products that facilitate optimization of quantum-enhanced feature generation are described.

According to an embodiment, a system can comprise a processor that executes computer executable components stored in memory. The computer executable components comprise a selection component that selects a quantum circuit for mapping a set of classical features to a high-dimensional quantum feature space and that provides the quantum circuit for execution by a quantum computer to map the set of classical features and to produce quantum-enhanced features. The computer executable components further comprise a training component that assesses quantum circuit selection based on output from execution of the quantum circuit by the quantum computer and causes the selection component to select a new quantum circuit based on the assessment.

According to another embodiment, a computer-implemented method can comprise selecting, by a system operatively coupled to a processor, a quantum circuit for mapping a set of classical features to a quantum feature space. The computer-implemented method can further comprise providing, by the system, the quantum circuit for execution by a quantum computer to map the set of classical features and to produce quantum-enhanced features. The computer-implemented method can further comprise assessing, by the system, quantum circuit selection based on output from execution of the quantum circuit by the quantum computer, and selecting, by the system, a new quantum circuit based on the assessment.

According to another embodiment, a computer program product comprising a computer readable storage medium having program instructions embodied therewith, the program instructions executable by a processor to cause the processor to select a quantum circuit for mapping a set of classical features to a quantum feature space. The program instructions are further executable by the processor to cause the processor to provide the quantum circuit for execution by a quantum computer to map the set of classical features and to produce quantum-enhanced features. The program instructions are further executable by the processor to cause the processor to assess quantum circuit selection based on output from execution of the quantum circuit by the quantum computer and select a new quantum circuit based on the assessment.

DETAILED DESCRIPTION

Figure 1:
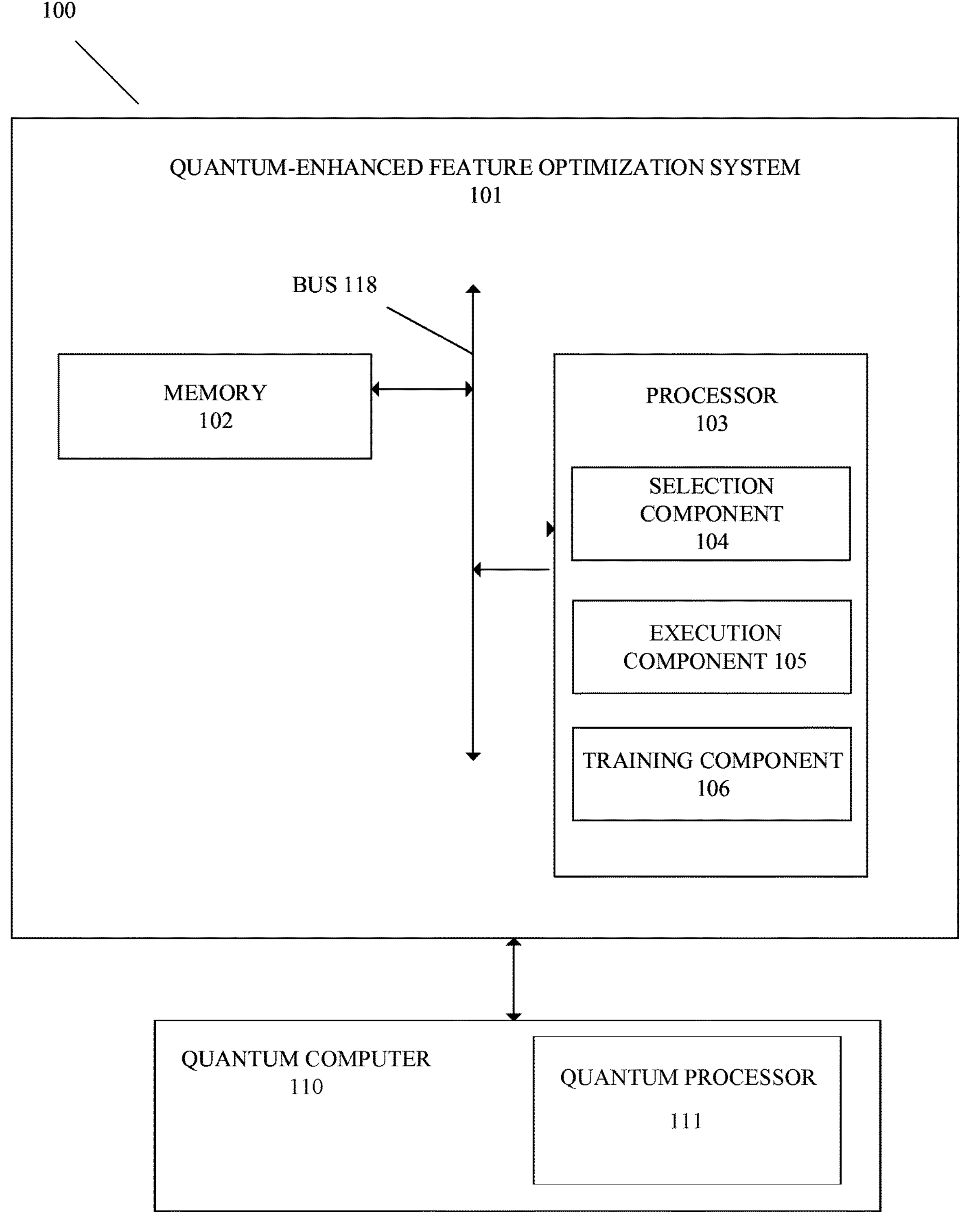
FIG. 1 illustrates a block diagram of an example, non-limiting system that can facilitate optimization of quantum-enhanced feature generation in accordance with one or more embodiments described herein.

The following detailed description is merely illustrative and is not intended to limit embodiments and/or application or uses of embodiments. Furthermore, there is no intention to be bound by any expressed or implied information presented in the preceding Background or Summary sections, or in the Detailed Description section.

Quantum computing has shown promise in addressing problems in classes such as chemistry, machine learning, optimization, and simulation in novel ways. It is expected that quantum computing will allow more accurate solutions to be produced faster and allow problems to be addressed that have been previously un-addressable.

Recently, there has been a surge of interest in quantum-enhanced features and feature spaces for machine learning applications Quantum circuits are employed to engineer such features, leveraging the exponential Hilbert space. The goal is to engineer features (that would be computationally prohibitive to discover with classical computing alone) which can be employed in (classical or quantum) machine learning training and ultimately allow better models to be trained. For example, these models may perform better according to metrics such as accuracy, fairness, etc.

In machine learning, one of the most promising quantum applications areas is quantum feature transformation. This involves using quantum computers to generate novel features for machine learning tasks, which can then be used in fully classical machine learning models or in quantum machine learning models. The quantum state space grows exponentially with the number of qubits. Leveraging this state space as a feature space enables complex classification problems to be solved with significantly better accuracies. In effect, this means interpreting the quantum Hilbert space as a feature map. Quantum application can show improvement when compared with classical approaches due to the complexity-theoretic hardness of quantum circuits. Choosing which quantum circuit/algorithm, that cannot be classically simulated efficiently, is appropriate for a given quantum feature transformation and mostly can be addressed heuristically. Therefore, this choice benefits from an optimization process.

However, optimization of the selection of quantum circuits raises some uniquely quantum problems such as the following. Executing quantum circuits with real quantum hardware is expensive in both time and material costs. When using real hardware, care should be taken not to focus too much on exploring highly different quantum circuits rather than exploiting quantum circuits highly similar to previous quantum circuits. Not all quantum circuits are suitable for exploration during an optimization process. For example, some quantum circuits are not achievable due to physical or engineering constraints. Additionally, not all quantum circuits, or feature spaces, offer performance advantages over classical circuits due to lack of sufficient entanglement or due to the size of the feature space. Furthermore, given the heuristic nature of quantum feature transformation, an optimization process carried out once will not apply effectively to all problem types. Additionally, it is desirable that the quantum resources employed are used as efficiently as possible in order to achieve a certain accuracy (or other performance metric) of the final model. This includes using, if possible, simple quantum circuits (fewer qubits, fewer control gates, fewer multi-qubit gates, etc.) and quantum hardware (less stringent requirements on error rates, connectivity, etc.).

Given problems described above, the present disclosure can be implemented to produce a solution to these problems in the form of systems, computer-implemented methods, and/or computer program products that can facilitate optimization of quantum-enhanced feature generation by: selecting a quantum circuit for mapping a set of classical features to a high-dimensional feature space; executing mapping of the set of classical features by the quantum circuit to produce quantum-enhanced features; and/or optimizing the selection of quantum circuits and selecting a new quantum circuit based on the optimization.

One or more embodiments are now described with reference to the drawings, where like referenced numerals are used to refer to like elements throughout. In the following description, for purposes of explanation, numerous specific details are set forth in order to provide a more thorough understanding of the one or more embodiments. It is evident, however, in various cases, that the one or more embodiments can be practiced without these specific details.

Figure 2:
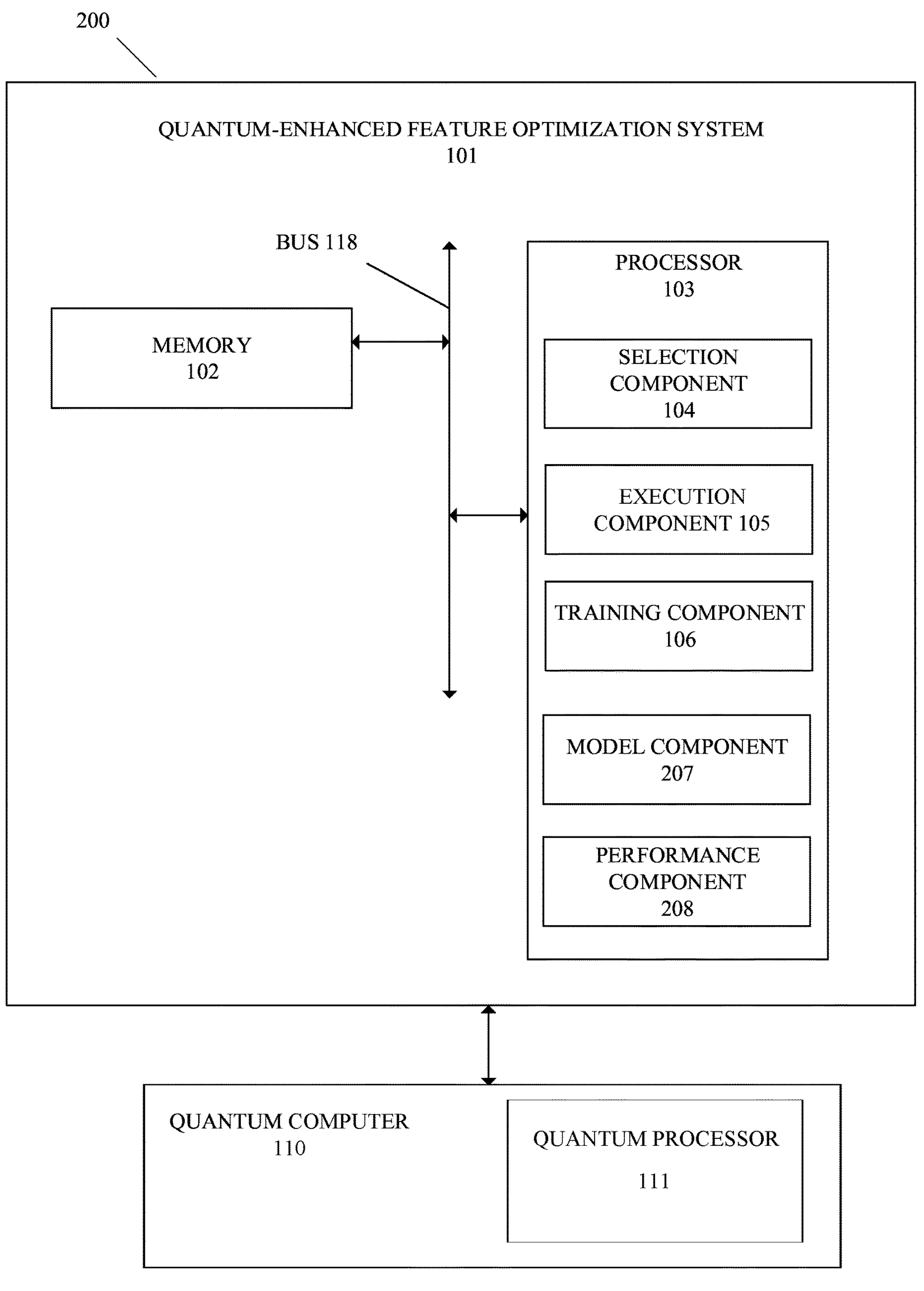
FIG. 2 illustrates a block diagram of an example, non-limiting system that can facilitate optimization of quantum-enhanced feature generation in accordance with one or more embodiments described herein.

FIGS. 1 and 2 illustrate block diagrams of example, non-limiting systems 100 and 200 respectfully that can facilitate optimization of quantum-enhanced feature generation. Systems 100 and 200 can each comprise quantum-enhanced feature optimization system 101. Quantum-enhanced feature optimization system 101 of system 100 can comprise classical computing components including a memory 102, a processor 103, a selection component 104, an execution component 105, and a training component 106 and/or a bus 118. Systems 100 and 200 further comprise a quantum computer 110 comprising a quantum processor 111. Quantum-enhanced feature optimization system 101 of system 200 can further comprise a model component 207, and/or a performance component 208.

It should be appreciated that the embodiments of the subject disclosure depicted in various figures disclosed herein are for illustration only, and as such, the architecture of such embodiments are not limited to the systems, devices, and/or components depicted therein. For example, in some embodiments, system 100, system 200, and/or quantum-enhanced feature optimization system 101 can further comprise various computer and/or computing-based elements described herein with reference to operating environment 1000 and FIG. 10. In several embodiments, such computer and/or computing-based elements can be used in connection with implementing one or more of the systems, devices, components, and/or computer-implemented operations shown and described in connection with FIG. 1, FIG. 2 and/or other figures disclosed herein. In various aspects, the quantum computer 110 can comprise any suitable quantum hardware. For example, the quantum computer 110 can include a quantum processor 111 comprising any suitable substrates (e.g., silicon wafers) on which are fabricated any suitable number of any suitable types of qubit devices such as superconducting qubits, e.g., transmon qubits comprising Josephson Junctions. The qubits can be arranged and/or coupled together on such quantum substrates in any suitable fashion (e.g., qubits can be arranged in rectilinear arrays, in hexagonal arrays, and/or in any other suitable shapes) and coupled via any suitable coupling devices such as capacitors. The quantum computer 110 can also include suitable quantum control hardware, such as microwave resonators, waveguides, and/or any suitable signaling components (e.g., transmitters and/or receivers) which can send electrical and/or optical stimuli to actuate operations on and/or take measurements of the qubits. That is, such quantum control hardware can be used to controllably alter the states of the qubits. In any case, the quantum computer 110 can facilitate quantum computations. That is, the quantum computer 110 can, in various instances, apply any suitable quantum circuit to any suitable quantum state, and results of the quantum computation can be provided as output. The qubit devices are not limited to superconducting qubits and any suitable type of qubits may be used with associated appropriate transmitting and receiving components. Accordingly, the illustrated non-limiting systems 100 and 200 can be hybrid systems and can include both a quantum portion (e.g., the quantum computer 110) and a classical portion (e.g., including the components of optimization system 101). In one or more embodiments, the quantum computer 110 can be separate from but function in combination with the optimization system 101. Quantum computer 110 can receive input from system 101, proceed with executions, and return output to system 101.

Memory 102 can store one or more computer and/or machine readable, writable, and/or executable components and/or instructions that, when executed by processor 103 (e.g., a classical processor, a quantum processor, and/or another type of processor), can facilitate performance of operations defined by the executable component(s) and/or instruction(s). For example, memory 102 can store computer and/or machine readable, writable, and/or executable components and/or instructions that, when executed by processor 103, can facilitate execution of the various functions described herein relating to quantum-enhanced feature optimization system 101, selection component 104, execution component 105, training component 106, model component 207, performance component 208 and/or another component associated with quantum-enhanced feature optimization system 101.

Memory 102 can comprise volatile memory (e.g., random access memory (RAM), static RAM (SRAM), dynamic RAM (DRAM), and/or another type of volatile memory) and/or non-volatile memory (e.g., read only memory (ROM), programmable ROM (PROM), electrically programmable ROM (EPROM), electrically erasable programmable ROM (EEPROM), and/or another type of non-volatile memory) that can employ one or more memory architectures. Further examples of memory 102 are described below with reference to system memory 1016 and FIG. 10. Such examples of memory 102 can be employed to implement any embodiments of the subject disclosure.

Processor 103 can comprise one or more types of processors and/or electronic circuitry (e.g., a classical processor, a quantum processor, and/or another type of processor and/or electronic circuitry) that can implement one or more computer and/or machine readable, writable, and/or executable components and/or instructions that can be stored on memory 102. For example, processor 103 can perform various operations that can be specified by such computer and/or machine readable, writable, and/or executable components and/or instructions including, but not limited to, logic, control, input/output (I/O), arithmetic, and/or the like. In some embodiments, processor 103 can comprise one or more central processing unit, multi-core processor, microprocessor, dual microprocessors, microcontroller, System on a Chip (SOC), array processor, vector processor, quantum processor, and/or another type of processor. Further examples of processor 103 are described below with reference to processing unit 1014 and FIG. 10. Such examples of processor 103 can be employed to implement any embodiments of the subject disclosure.

Quantum-enhanced feature optimization system 101, memory 102, processor 103, selection component 104, execution component 105, training component 106, model component 207, performance component 208, and/or another component of quantum-enhanced feature optimization system 101 as described herein can be communicatively, electrically, operatively, and/or optically coupled to one another via bus 118 to perform functions of system 100, system 200, quantum-enhanced feature optimization system 101, and/or any components coupled therewith. Bus 118 can comprise one or more memory bus, memory controller, peripheral bus, external bus, local bus, a quantum bus, and/or another type of bus that can employ various bus architectures. Further examples of bus 118 are described below with reference to system bus 1018 and FIG. 10. Such examples of bus 118 can be employed to implement any embodiments of the subject disclosure.

Quantum-enhanced feature optimization system 101 can comprise any type of component, machine, device, facility, apparatus, and/or instrument that comprises a processor and/or can be capable of effective and/or operative communication with a wired and/or wireless network. All such embodiments are envisioned. For example, quantum-enhanced feature optimization system 101 can comprise a server device, a computing device, a general-purpose computer, a special-purpose computer, a tablet computing device, a handheld device, a server class computing machine and/or database, a laptop computer, a notebook computer, a desktop computer, a cell phone, a smart phone, a consumer appliance and/or instrumentation, an industrial and/or commercial device, a digital assistant, a multimedia Internet enabled phone, a multimedia players, and/or another type of device.

Quantum-enhanced feature optimization system 101 can be coupled (e.g., communicatively, electrically, operatively, optically, and/or coupled via another type of coupling) to one or more external systems, sources, and/or devices (e.g., classical and/or quantum computing devices, communication devices, and/or another type of external system, source, and/or device) using a wire and/or a cable. For example, quantum-enhanced feature optimization system 101 can be coupled (e.g., communicatively, electrically, operatively, optically, and/or coupled via another type of coupling) to one or more external systems, sources, and/or devices (e.g., classical and/or quantum computing devices, communication devices, and/or another type of external system, source, and/or device) using a data cable including, but not limited to, a High-Definition Multimedia Interface (HDMI) cable, a recommended standard (RS) 232 cable, an Ethernet cable, and/or another data cable.

In some embodiments, quantum-enhanced feature optimization system 101 can be coupled (e.g., communicatively, electrically, operatively, optically, and/or coupled via another type of coupling) to one or more external systems, sources, and/or devices (e.g., classical and/or quantum computing devices, communication devices, and/or another type of external system, source, and/or device) via a network. For example, such a network can comprise wired and/or wireless networks, including, but not limited to, a cellular network, a wide area network (WAN) (e.g., the Internet) or a local area network (LAN). Quantum-enhanced feature optimization system 101 can communicate with one or more external systems, sources, and/or devices, for instance, computing devices using virtually any desired wired and/or wireless technology, including but not limited to: wireless fidelity (Wi-Fi), global system for mobile communications (GSM), universal mobile telecommunications system (UMTS), worldwide interoperability for microwave access (WiMAX), enhanced general packet radio service (enhanced GPRS), third generation partnership project (3GPP) long term evolution (LTE), third generation partnership project 2 (3GPP2) ultra mobile broadband (UMB), high speed packet access (HSPA), Zigbee and other 802.XX wireless technologies and/or legacy telecommunication technologies, BLUETOOTH®, Session Initiation Protocol (SIP), ZIGBEE®, RF4CE protocol, WirelessHART protocol, 6LoWPAN (IPv6 over Low power Wireless Area Networks), Z-Wave, an ANT, an ultra-wideband (UWB) standard protocol, and/or other proprietary and non-proprietary communication protocols. Therefore, in some embodiments, quantum-enhanced feature optimization system 101 can comprise hardware (e.g., a central processing unit (CPU), a transceiver, a decoder, quantum hardware, a quantum processor, and/or other hardware), software (e.g., a set of threads, a set of processes, software in execution, quantum pulse schedule, quantum circuit, quantum gates, and/or other software) or a combination of hardware and software that can facilitate communicating information between quantum-enhanced feature optimization system 101 and external systems, sources, and/or devices (e.g., computing devices, communication devices, and/or another type of external system, source, and/or device).

Quantum-enhanced feature optimization system 101 can comprise one or more computer and/or machine readable, writable, and/or executable components and/or instructions that, when executed by processor 103 (e.g., a classical processor, a quantum processor, and/or another type of processor), can facilitate performance of operations defined by such component(s) and/or instruction(s). Further, in numerous embodiments, any component associated with quantum-enhanced feature optimization system 101, as described herein with or without reference to the various figures of the subject disclosure, can comprise one or more computer and/or machine readable, writable, and/or executable components and/or instructions that, when executed by processor 103, can facilitate performance of operations defined by such component(s) and/or instruction(s). For example, selection component 104, execution component 105, training component 106, model component 207, performance component 208, and/or any other components associated with quantum-enhanced feature optimization system 101 as disclosed herein (e.g., communicatively, electronically, operatively, and/or optically coupled with and/or employed by quantum-enhanced feature optimization system 101), can comprise such computer and/or machine readable, writable, and/or executable component(s) and/or instruction(s). Consequently, according to numerous embodiments, quantum-enhanced feature optimization system 101 and/or any components associated therewith as disclosed herein, can employ processor 103 to execute such computer and/or machine readable, writable, and/or executable component(s) and/or instruction(s) to facilitate performance of one or more operations described herein with reference to quantum-enhanced feature optimization system 101 and/or any such components associated therewith.

Quantum-enhanced feature optimization system 101 can facilitate (e.g., via processor 103) performance of operations executed by and/or associated with selection component 104, execution component 105, training component 106, model component 207, performance component 208, and/or another component associated with quantum-enhanced feature optimization system 101 as disclosed herein. For example, as described in detail below, quantum-enhanced feature optimization system 101 can facilitate (e.g., via processor 103): selecting a quantum circuit for mapping a set of classical features to quantum feature space; providing the quantum circuit for execution to quantum computer (for execution via quantum processor 111) or to a quantum simulator to map the set of classical features and to produce quantum-enhanced features; and/or optimizing selection of quantum circuits and selecting a new quantum circuit based on the optimization, e.g., in an iterative processing manner. Multiple quantum circuits may be selected and executed in practice, depending on how the mapping is decomposed into gates and how much quantum computing resources are available.

Selection component 104 can select a quantum circuit for mapping a set of classical features to a quantum feature space, e.g., that can be considered higher-dimensional quantum feature space relative to a classical feature space. In this regard, the quantum feature space may be considered higher-dimensional compared to classical feature space because the quantum Hilbert space is of higher order, e.g., due to properties of entanglement, which gives rise to quantum features that are not possible classically. The quantum circuit is selected from a curated set of relevant circuits, which may be gathered from public repository such as Qiskit's GitHub repository and, possibly, further curated. For example, selection component 104 can select a quantum circuit at random from such a set of curated quantum circuits. As another example, an ansatz circuit may be specified by the user. The set of circuits to choose from may satisfy constraints in terms of, for instance, the number of required qubits (which in turn depends on the number of features—e.g., each feature requires one qubit) and the circuit depth (the quantum hardware may limit the depth of the circuits due to noise). In an exemplary framework, the circuits may include variational circuits that have parameters, and these parameters can then be tuned in the optimization (e.g., effectively amounting to selecting new circuits). In another embodiment, selection component 104 can select a quantum circuit based on a set of input parameters. For example, the user may have knowledge that a certain type of quantum feature map could be particularly effective for the given application and would thus indicate that only quantum circuits for that feature map family would be considered. For example, if an input parameter specifies a large performance gain in comparison to a classically trained machine learning model, selection component 104 can select a relatively complex quantum circuit (e.g., quantum circuit with a relatively wide width and depth and a large degree of multi-particle entanglement). In an embodiment, selection component 104 can select a quantum circuit by selecting one or more quantum gates from a list of quantum gates, and then connecting the one or more quantum gates to form a quantum circuit. In another embodiment, selection component 104 can select a quantum circuit based on a list of previously selected quantum circuits. In another embodiment, the list may be chosen based on popularity of the quantum circuits, for example, how often a quantum circuit (within perhaps a certain domain category) has been forked from a public repository or executed on certain hardware. In another embodiment, the list may be compiled by initializing the parameters of certain variational circuits with random values. For example, as described in detail below, selection component 104 can select a quantum circuit based on optimization feedback from training component 106 based on quantum circuits selected by selection component 104 in previous iterations. In an embodiment, selection component 104 can have hard bounds to prevent the selection of some quantum circuits, such as all quantum circuits lacking a sufficient number of entangling gates and circuits that are beyond the limits of current hardware.

A variety of exemplary quantum circuits may be considered from which to select a quantum circuit. For example, variational quantum circuits and circuits implementing ZZ feature maps and Pauli feature maps may be considered. Discussion of such exemplary quantum circuits may be found, for example, in "Supervised learning with quantum enhanced feature spaces," by Vojtech Havlicek et at., *Nature* 567, 209-212 (2019).

In an embodiment, selection component 104 can determine that a quantum circuit should not be selected and that a quantum transformation should not be used. For example, selection component 104 can receive a machine learning task to select a quantum circuit for use in mapping the classical features. Selection component 104 can then decide if the machine learning task would benefit from the use of a quantum circuit and quantum transformation. In this example, selection component 104 can decide to select or not to select a quantum circuit based on whether a classically trained machine learning model offers adequate performance to complete the machine learning task. For example, there may be a threshold performance for one or more metrics (e.g., accuracy, fairness, etc.), and quantum-enhanced features are only considered if the classically trained machine learning model does not meet the selected, e.g., predetermined, threshold. In another example, the selection component may compare the received task with historical tasks and only explore quantum-enhanced features if there is historical precedent for using quantum-enhanced features for that type of task. In an embodiment, if a feature space of the machine learning task is very large, selection component 104 can determine that a quantum-enhanced feature trained machine learning model offers improved performance due to the ability of quantum computing models to represent large amounts of data more efficiently. This could involve comparing the number of features with a selected, e.g., predetermined, threshold in order to assess if the number of features, and hence the feature space, is large. Additional statistical analyses could be included to assess the degree of correlation/independence of the features, which would again impact the feature space. In another example, selection component 104 can determine that the feature space of a machine learning task is small enough to be performed efficiently by a classically trained machine learning model. This may be achieved, e.g., by comparing against a selected, e.g., predetermined, threshold. In another example, selection component 104 can determine whether to select a quantum circuit based on an F-score (a measure of the accuracy of a machine learning model). For example, if the F-score of a classically trained machine learning model is A but a score of B is called for, wherein A<B, then selection component 104 can proceed with selecting a quantum circuit. In these examples, if selection component 104 determines that a quantum-enhanced feature trained machine learning model offers improved performance, selection component 104 can select a quantum circuit as described above. If selection component 104 determines that a classically trained machine learning model offers adequate performance, selection component 104 can pass the machine learning task to a classically trained machine learning model and not select a quantum circuit.

Execution component 105 can provide the quantum circuit for execution by quantum computer 110 or by quantum simulator (e.g., running on processor 103 or another classical processor) to map the set of classical features and to produce quantum-enhanced features. For example, quantum processor 111 or a quantum simulator can execute quantum circuits to nonlinearly map the classical features to a higher-dimensional quantum feature space, namely the quantum Hilbert space (which is a higher-dimensional space compared to classical feature space, e.g., due to quantum properties of entanglement as mentioned previously). The quantum-enhanced features are thus features in this higher-dimensional feature space. Nevertheless, this is analogous to classical feature mapping where features may be transformed from one feature space to another. In exemplary mapping according to the disclosure, however, the mapping may take advantage of the high dimensionality of the quantum state space, particularly when entanglement is present. Quantum entanglement is a uniquely quantum phenomenon that can provide quantum computing with performance advantages over classical computing. Suitable quantum gates for the circuits are chosen to encode the data and carry out the mapping. Additional information regarding selection of quantum circuits is described below. By mapping the set of classical features by the quantum circuit, a relatively large amount of information can be efficiently represented as set of quantum-enhanced features, due to the above-described performance advantages of quantum computing compared to classical computing when dealing with large amounts of data.

In an embodiment, execution component 105 can determine whether to have the quantum circuit executed on either real quantum hardware (a real quantum computer) or by quantum simulation (a quantum simulator executing on a classical computer) in order to map of the set of classical features and to produce the quantum-enhanced features. Executing quantum circuits on real quantum hardware may be more expensive in terms of time and hardware cost for simpler circuits; however, more complicated circuits of significant depth may not be amendable to execution on a quantum simulator executing on a classical computer. In an example, execution component 105 can determine whether to execute the quantum circuit on real quantum hardware or on a quantum simulation based on a percentage value. For example, execution component 105 can receive an input parameter that a certain percentage of quantum circuits should be executed on real quantum hardware. Execution component 105 can determine whether to use real quantum hardware or to use a quantum simulation based on the certain percentage received as an input parameter. In another embodiment, execution component 105 can determine whether to execute the quantum circuit on either real quantum hardware or a quantum simulation based on feedback from the training component 106. For example, if the selection component 104 selects a new quantum circuit highly similar to a previously selected quantum circuit, based on feedback from the training component 106, execution component 105 can determine to execute the quantum circuit on real quantum hardware due to the similarity between the new quantum circuit and the previous quantum circuit. Additionally, if the selection component selects a new quantum circuit with a low similarity to a previously selected quantum circuit, execution component 105 can determine to execute the quantum circuit on a quantum simulation. In another embodiment, execution component 105 can determine whether to execute the quantum circuit on either real quantum hardware or a quantum simulation based on real quantum hardware availability and/or an estimated time to complete mapping using real quantum hardware. In another embodiment, execution component 105 can determine a specific piece of quantum hardware to execute mapping on. For example, if execution component 105 has access to a first piece of quantum hardware and a second piece of quantum hardware, execution component can determine that mapping should take place on the first piece of quantum hardware.

Model component 207 can train a machine learning model based on the quantum-enhanced features. For example, model component 207 can provide the quantum-enhanced features to the machine learning model under consideration, which is then trained using the quantum-enhanced features as a training set in order to train the machine learning model to perform a task. For example, the machine learning model can be trained to identify an object in an image, wherein the quantum-enhanced features are used as a training set. In an embodiment, this training process can be iterative where the machine learning model is provided with and trained on new quantum-enhanced features based on the selection component 104 selecting a new quantum circuit and execution component 105 providing the new quantum circuit to produce the new mapping and the new quantum-enhanced features. That is, the process of creating quantum-enhanced features and then using said features to train a machine learning model to explore if a better model can be achieved may be iterative. In this example, the selection of the new quantum circuit can be based on improving the performance of the machine learning model or simplified quantum circuits (fewer qubits, fewer control gates, fewer multi-qubit gates, etc.) in order to improve efficiency. In an embodiment, the machine learning model under consideration can be a classical machine learning model. In another embodiment, the machine learning model under consideration can be a quantum machine learning model, such as a model wherein variational quantum circuits directly deliver a prediction.

Performance component 208 can evaluate the machine learning model based on at least one metric. For example, performance component 208 can evaluate the machine learning model based on a performance measurement. In an embodiment, the performance measurement can be an F-score (a measure of the accuracy of the machine learning model). For example, if the machine learning model under consideration is trained to identify a certain object in an image, performance component 208 can test the machine learning model's ability to correctly identify the object and generate an F-score that indicates the machine learning model's accuracy in its predictions. In another embodiment, the performance measurement can be another desirable characteristic for the machine learning model, such as a minimal bias criteria or a penalty to limit the total number of features to enhance explainability. Additionally, the performance measurement can be based on criteria such as a particular industry or field of use for the machine learning model, user-specified goals, available computer resources, and/or time sensitivity.

Training component 106 can optimize selection of quantum circuits and signal the selection component 104 to select a new quantum circuit based on the optimization. In an embodiment, training component 106 can optimize the selection process by signaling the selection component to select a new quantum circuit based on a measure of similarity to a previous quantum circuit. For example, selection component 104 can determine a measure of similarity between quantum circuits by comparing factors such as the circuit depth and width, the types of quantum gates within the circuit, the total number of gates within the circuits, and/or the arrangement of gates within the quantum circuits. In another embodiment, training component 106 can generate random quantum circuit elements and signal selection component 104 to include the random quantum circuit elements in the new quantum circuit. In another embodiment, training component 106 can optimize the selection of quantum circuits based additionally on the set of classical features and the evaluation of the machine learning model. For example, if performance component 208 evaluates the machine learning model as performing well (for example the machine learning model exhibits a high level of accuracy in its task), training component 106 can optimize the selection of quantum circuits by signaling the selection component 104 to select a quantum circuit with a high similarity to a previously selected quantum circuit. Additionally, if the performance component 209 evaluates the machine learning model as performing poorly (for example the machine learning model exhibits a low level of accuracy in its task), training component 106 can optimize the selection of quantum circuits by signaling the selection component 104 to select a new quantum circuit with a low similarity to a previous quantum circuit in order to refine the training process.

For example, if the machine learning model performs well, then quantum circuit used for mapping produced an effective quantum-enhance feature space and selection of future quantum circuits can be optimized to select similar circuits and/or simpler circuits that produce similar quantum enhanced feature spaces. In contrast, if the machine learning model performed poorly, then the quantum circuit used for mapping produced an ineffective quantum-enhanced feature space and selection of future quantum circuits can be optimized to select highly different quantum circuits and thus highly different quantum-feature spaces. In an embodiment, training component 106 can tailor optimization based on different parameters. For example, training component 106 can tailor optimization based on problem characteristics, a number of human users, a particular industry or field of use, user-specified goals, available computer resources, and/or time sensitivity. In an embodiment, training component 106 can optimize the selection of new quantum circuits based on decreasing the requirements placed on quantum resources. In an embodiment, training component 106 can optimize selection of new quantum circuits to decrease requirements placed on quantum resources by signaling selection component to select a new quantum circuit that can have fewer qubits, fewer gates, less qubit connectivity, fewer quantum gates, fewer multi-qubit gates, and/or the size of the Hilbert space of the quantum enhanced features produced by the new quantum circuit. For example, if the machine learning component performed well, and thus the quantum circuit produced an effective quantum feature space, then training component 106 can signal selection component to select a new quantum circuit that is highly similar to the previous quantum circuit but has fewer qubits and/or fewer quantum gates.

In an embodiment, training component 106 can comprise a second machine learning model to assist in optimization. For example, training component 106 can comprise a generative adversarial network (GAN) in order to facilitate optimization of the selection of quantum circuits. A GAN is a class of machine learning system. A GAN can comprise two opponents or adversaries which are a generator and a discriminator. These two adversaries can compete with one and other through the training process. For example, the generator can generate real-looking test results/images in order to fool the discriminator. These generated real-looking test results/images are fed to the discriminator. The discriminator can determine whether it believes a test result/image is a real result/image or if it is fake. In this example, training component 106 can utilize a generator and a discriminator to optimize selection of quantum circuits. The generator can create generated quantum circuits that allow new quantum-enhanced features to be produced. The discriminator can then try to decide if these generated quantum circuits are "real" or not. In effect, the discriminator can try to filter out generated quantum circuits that have no value due to either being useless (e.g., repeated applications of an identity gate) or due to being difficult or impossible to realize physically due to hardware restraints. In another embodiment, the discriminator can filter out generated quantum gates based of a minimization of quantum resources. For example, the discriminator can filter out generated quantum gates based on a determination that the generated quantum gate comprises to many qubits, quantum gates, control gates, and/or the Hilbert space of the produced quantum feature space is too large. For example, discrimination can filter out quantum circuits based on a determination that the generated quantum circuit has more quantum gates than a threshold. If the discriminator filters out the generated quantum circuit as having no value, then the generator and training component 106 can signal selection component 104 to select a new quantum circuit highly different from the generated quantum circuit. If the discriminator does not filter out the generated quantum circuit, then the generator and training component 106 can signal the selection component to select a new quantum circuit that is highly similar to the generated quantum circuit in order refine or improve performance of the machine learning model. In an embodiment, the GAN model can be a multi-discriminator GAN model which comprises two or more discriminators.

In an embodiment, training component 106 can comprise a reinforcement learning agent. In order to assist the generator, a reinforcement learning agent can be employed. As such, the reinforcement learning agent can provide feedback to the generator to ensure its effectiveness. In reinforcement learning, the reinforcement learning agent takes an action within the agent's action space, which can be interpreted into a reward/penalty and a state which are fed back to the reinforcement learning agent. In particular, the reinforcement learning agent's reward function is determined by performance of the machine learning model and/or the generator. For example, if performance component 208 evaluates the machine learning model of model component 207 as performing well, the reinforcement learning agent can interpret this as a reward and provided feedback to the generator to generate a quantum circuit similar one the machine learning model was previously trained on. In another embodiment, if the discriminator does not filter out the generated quantum circuit, the reinforcement learning agent can also interpret this as a reward. The reinforcement learning agent's action space can comprise different quantum circuit configurations as well as the option of running a quantum circuit on real quantum hardware vs. quantum simulations. The action space and reward function can be adjusted to steer the reinforcement learning agent towards the most promising quantum circuits that cannot be efficiently simulated classically. For example, if the machine learning model performs well, the reinforcement agent can adjust its action space towards containing more quantum circuits similar to the previous one the machine learning model was trained on. Additionally, the reinforcement learning agent can balance exploitation and exploration (e.g., the agent can balance generation of new circuits between testing many similar circuits and testing highly different circuits that may perform better). In particular, the reinforcement learning agent can signal selection component 104 to sporadically include random circuit elements or gates in selected quantum circuits in order to explore potentially even more suitable circuits. As the reinforcement learning agent's action space comprises the option of running a quantum circuit on real quantum hardware vs. quantum simulations, training component 106 can provide feedback, via the reinforcement learning agent, to the execution component 105 in order to assist the execution component in determining whether to execute the quantum circuit on real quantum hardware or on a quantum simulation. For example, the reinforcement learning agent can have a parameter, such as the probability that a new quantum circuit is mapped using real quantum hardware set to a percentage. This parameter can be fed to execution component 105 to assist execution component 105 in determining whether to execute the quantum circuit to carry out mapping using real quantum hardware or a quantum simulation. In an embodiment, the reinforcement learning agent can be a value-based reinforcement learning agent, which comprises a value function and a value iteration algorithm that iterates over the value function, while in another embodiment, the reinforcement learning agent can be a policy-based reinforcement learning agent, which comprises a policy and a policy iteration algorithm that updates the policy.

In another embodiment, the second machine learning model can comprise an actor/critic model. An actor/critic model can comprise an actor and a critic. In an embodiment, the actor can operate similar to a generator in a GAN model, where the actor attempts to generate results in order to fool a critic. The critic can operate similar to a discriminator in a GAN model, where the critic attempts to determine if a result from the actor if a "real" result or a "false" one. However, in an actor/critic model, the actor can be a policy-based reinforcement learning agent and the critic can be a value-based reinforcement learning agent. In an embodiment, training component 106 can comprise an actor/critic model in order to facilitate optimization of the selection of quantum circuits in the same manner as described above in relation to a GAN model wherein the actor attempts to generate quantum circuits of value and the critic attempts to filter out generated circuits of low or no value.

The reward function of the reinforcement learning agent can incorporate rewards/penalties to account for constraints around quantum hardware. For example, performance of the machine learning model, as evaluated by performance component 208, that is achieved with a transformation using a quantum circuit using fewer qubits and/or fewer quantum gates can provide a higher reward than an identical performance obtained with a circuit using more qubits and/or more quantum gates. Additionally, some of the constraints on the action space are encoded as hard bound (e.g., all quantum circuits lacking a sufficient number of entangling gates are excluded and circuits that are beyond the limits of current hardware, e.g., because they are too deep, are likewise removed).

In an embodiment, quantum-enhanced feature optimization system 101 can iterate through the process of selection of a quantum circuit, execution of mapping of a classical feature set by the quantum circuit, and optimization of the selection of a new quantum circuit multiple times. For example, quantum-enhanced feature optimization system 101 can iterate through the process of selection of a quantum circuit, execution of mapping of a classical feature set by the quantum circuit, and optimization of the selection of a new quantum circuit continuously until a condition is met. In an embodiment, this condition could be when the performance of the machine learning model exceeds a threshold, when a certain number of iterations have been executed, when a certain time limit has been reached, and/or when a restriction on the features (number and complexity) has been exceeded.

Figure 3:
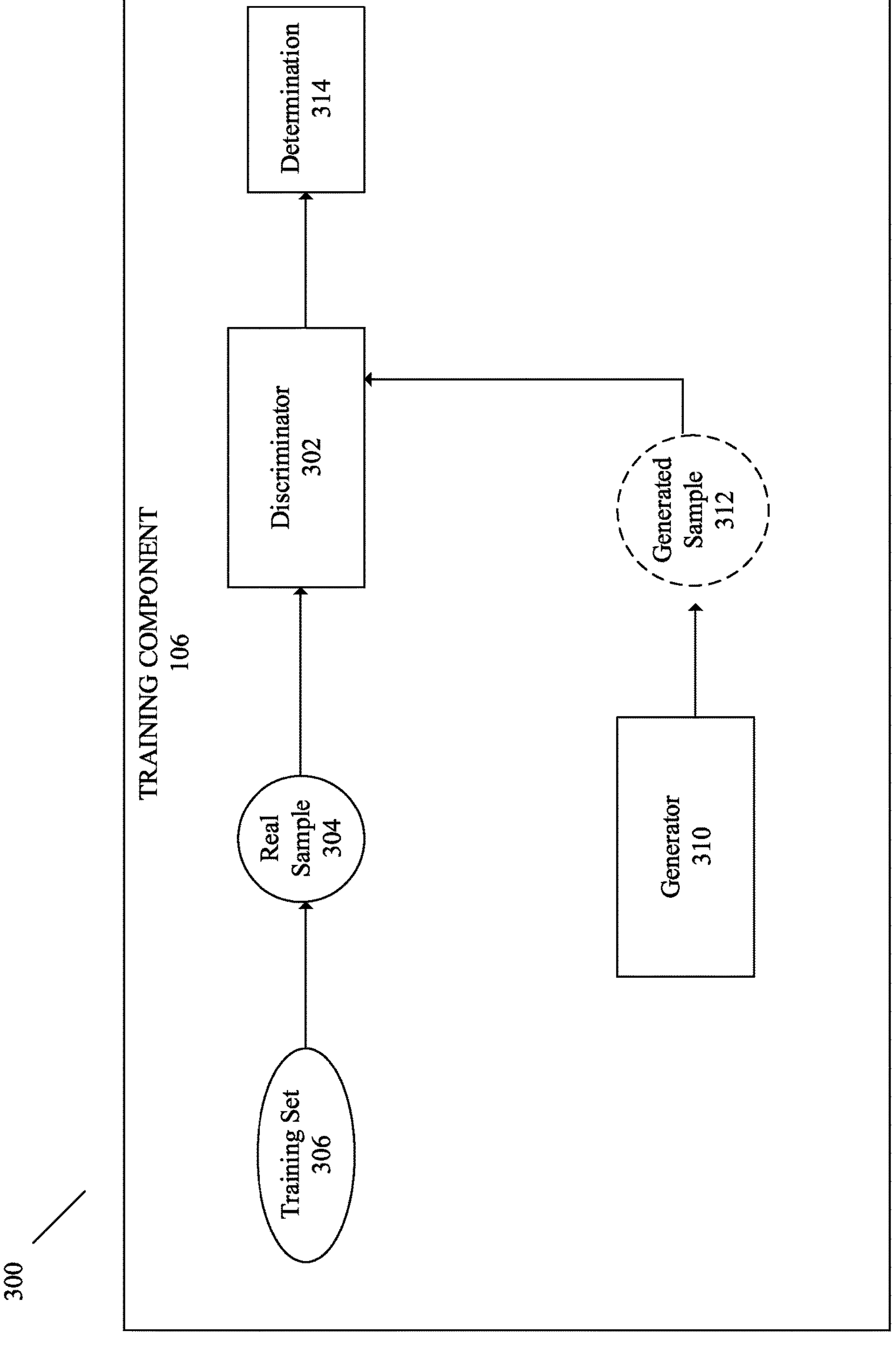
FIG. 3 illustrates a block diagram of an example, non-limiting system that can facilitate optimization of selection of quantum circuits in accordance with one or more embodiments described herein.

FIG. 3 illustrates a block diagram of example, non-limiting systems that can facilitate optimization of selection of quantum circuits in accordance with one or more embodiments described herein. Repetitive description of like elements and/or processes employed in respective embodiments is omitted for sake of brevity.

Diagram 300 comprises training component 106 of quantum-enhanced feature optimization system 101. Training component 106 comprises discriminator 302. Discriminator 302 can be trained from a real sample 304 from a training set 306. In an example, training set 306 can comprise a set of quantum-enhanced features from the mapping of a set of classical features to quantum circuits and/or a set of quantum circuits.

Training component 106 of quantum-enhanced feature optimization system 101 also comprises generator 310. As described above in reference to FIGS. 1 and 2, generator 310 can generate a quantum circuit, generated sample 312, in an attempt to trick discriminator 302. Generated sample 312 can then be fed to discriminator 302. Discriminator 302 can make determination 314 on whether discriminator 302 believes that generated sample 312 is a quantum circuit that is "real" (e.g., it is a circuit that has value) or that is "fake" (e.g. it is a circuit that has no value). In an embodiment, discriminator 302 can determine the value of generated sample 312 based on whether the circuit of generated sample is useless (e.g., repeated applications of an identity gate) or due to generated sample 312 being a circuit that is difficult or impossible to realize physically due to quantum hardware restraints. If discriminator 302 filters out generated sample 312, training component 106 can optimize selection of quantum circuits by signaling selection component 104 to select a new quantum circuit that is highly different from generated sample 312. If discriminator 302 does not filter out generated sample 312, training component 106 can optimize selection of quantum circuits by signaling selection component 104 to select a new quantum circuit that is highly similar to, or a refinement of generated sample 312. In an embodiment, selection component 104 can determine similarity of quantum circuits based on a comparison of factors between circuits such as circuit depth and width, the types of quantum gates within the circuits, and/or the arrangement of gates within the quantum circuits.

Figure 4:
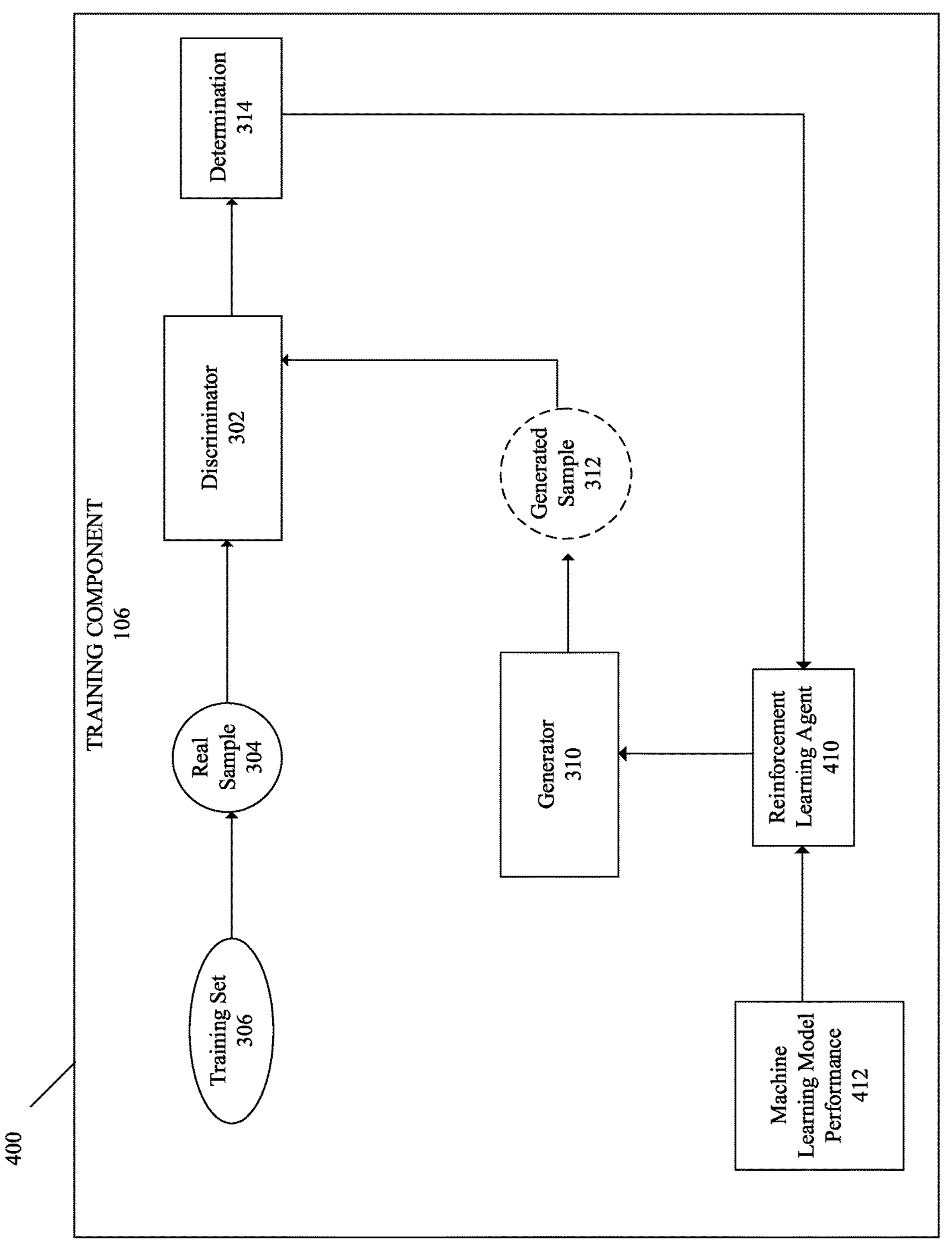
FIG. 4 illustrates a block diagram of an example, non-limiting systems that can facilitate optimization of selection of quantum circuits in accordance with one or more embodiments described herein.

FIG. 4 illustrates a block diagram of example, non-limiting systems that can facilitate optimization of selection of quantum circuits in accordance with one or more embodiments described herein. Repetitive description of like elements and/or processes employed in respective embodiments is omitted for sake of brevity.

Diagram 400 comprises training component 106 of quantum-enhanced feature optimization system 101. Training component 106 can additionally comprise reinforcement learning agent 410. As described above in reference to FIGS. 1 and 2, reinforcement learning agent 410 can provide feedback to generator 310 to ensure the effectiveness of generator 310. Reinforcement learning agent 410 can take an action within its action space, which can be interpreted into a reward/penalty and a state which can be fed back to the reinforcement learning agent. For example, reinforcement learning agent 410 can receive machine learning model performance 412, which can be interpreted as a reward if the machine learning model performed well or as a penalty if the machine learning model performed poorly. For example, reinforcement learning agent 410 can take an action which is fed as feedback to generator 310 in order to influence generator's 310 generation of generated sample 312. In another example, reinforcement learning agent 410 can receive determination 314, which can be interpreted by reinforcement learning agent 410 as a penalty or as a reward. If discriminator 302 is successful in its determination 310, this can be interpreted as a penalty by reinforcement learning agent 410 which can provide feedback to generator 310 to improve generator's 310 generated sample 312. Similarly, if discriminator 302 is unsuccessful in its determination 310, this can be interpreted as a reward by reinforcement learning agent 410, which can provide feedback to generator 310 to refine generated sample 312.

Figure 5:
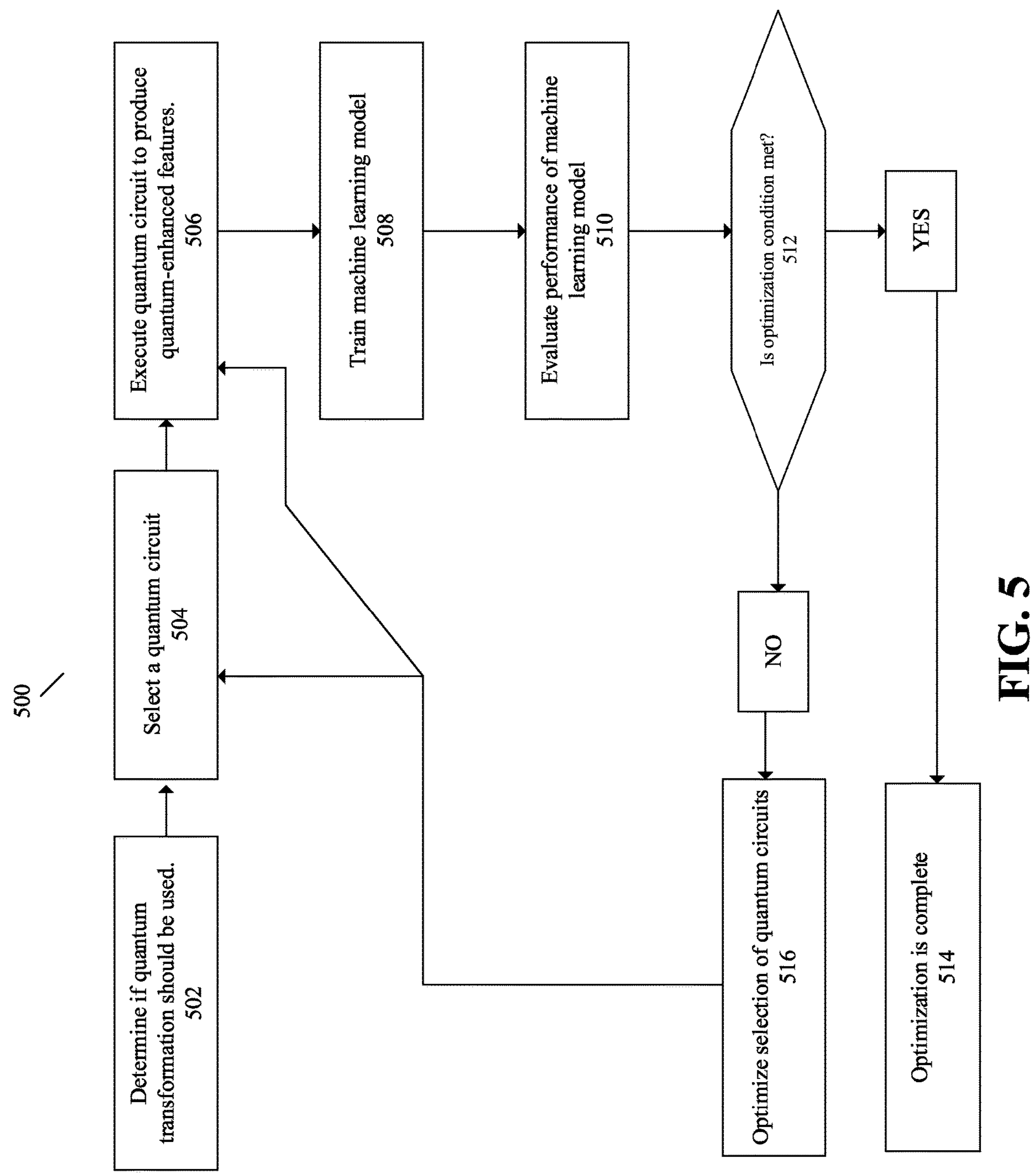
FIG. 5 illustrates a flow diagram of an example, non-limiting computer-implemented method that can facilitate optimization of quantum-enhanced feature generation in multiple iterations in accordance with one or more embodiments described herein.

FIG. 5 illustrates a flow diagram of an example, non-limiting computer-implemented method that can facilitate optimization of quantum-enhanced feature generation in multiple iterations in accordance with one or more embodiments described herein. Repetitive description of like elements and/or processes employed in respective embodiments is omitted for sake of brevity.

At 502, computer-implemented method 500 can comprise determining, by a system (e.g., quantum-enhanced feature optimization system 101 and/or selection component 104) operatively coupled to a processor (e.g., processor 103), whether to select a quantum circuit. For example, selection component 104 can decide to select a quantum circuit based on whether a classically trained machine learning model offers adequate performance, or whether a quantum transformation should be used. In this example, selection component can determine if a quantum circuit should be selected for a quantum transformation based on an F-score comparison or another means as described above in reference to FIGS. 1 and 2.

At 504, computer-implemented method 500 can comprise selecting, by the system (e.g., quantum-enhanced feature optimization system 101 and/or selection component 104), a quantum circuit for mapping a set of classical features to a high-dimensional feature space. For example, during a first iteration, selection component 104 can select a quantum circuit randomly or based off of an input parameter. In another example, selection component 104 can select a quantum circuit based on optimization feedback from training component 106.

At 506, computer-implemented method 500 can comprise executing, by the system (e.g., quantum-enhanced feature optimization system 101 and/or execution component 105) the quantum circuit to carry out mapping of the set of classical features and to produce quantum-enhanced features. As described above in reference to FIGS. 1 and 2, execution component 105 can determine whether to perform execution of the quantum circuit on real quantum hardware or on a quantum simulation.

At 508, computer-implemented method 500 can comprise training, by the system (e.g., quantum-enhanced feature optimization system 101 and/or model component 207), a machine learning model based on the quantum-enhanced features.

At 510, computer-implemented method 500 can comprise evaluating, by the system, (e.g., quantum-enhanced feature optimization system 101 and/or performance component 208) the machine learning model based on at least one metric. For example, in an embodiment, performance component 208 can evaluate the performance of the machine learning model based on an F-score.

At 512, computer-implemented method 500 can comprise determining, by the system (e.g., quantum-enhanced feature optimization system 101 and/or training component 106), whether an optimization condition is met. For example, if the optimization condition is a set number of iterations, training component 106 can determine if the number of completed iterations equals the optimization condition. In another example, the optimization condition can be an intended accuracy level. Training component 106 can compare an evaluated accuracy level of the machine learning component from performance component 208 to the optimization condition to determine if the evaluated accuracy level is equal to or higher than the optimization condition.

At 514, computer-implemented method 500 can comprise stopping, by the system (e.g., quantum-enhanced feature optimization system 101 and/or training component 106) the optimization process. For example, if training component 106 determines that the optimization condition was met in step 512, then training component 106 can stop the optimization process.

At 516, computer-implemented method 500 can comprise optimizing, by the system (e.g., quantum-enhanced feature optimization system 101 and/or training component 106) the selection of quantum circuits. For example, if training component 106 determines that the optimization condition was not met in step 512, then training component 106 can optimize the selection of quantum circuits and signal selection component 104 to select a new quantum circuit based on the optimization. Additionally, training component 106 can optimize the execution of mapping by the new quantum circuit by sending feedback to execution component 105 comprising whether the new quantum circuit should be executed on real quantum hardware or on a quantum simulation.

Figure 6:
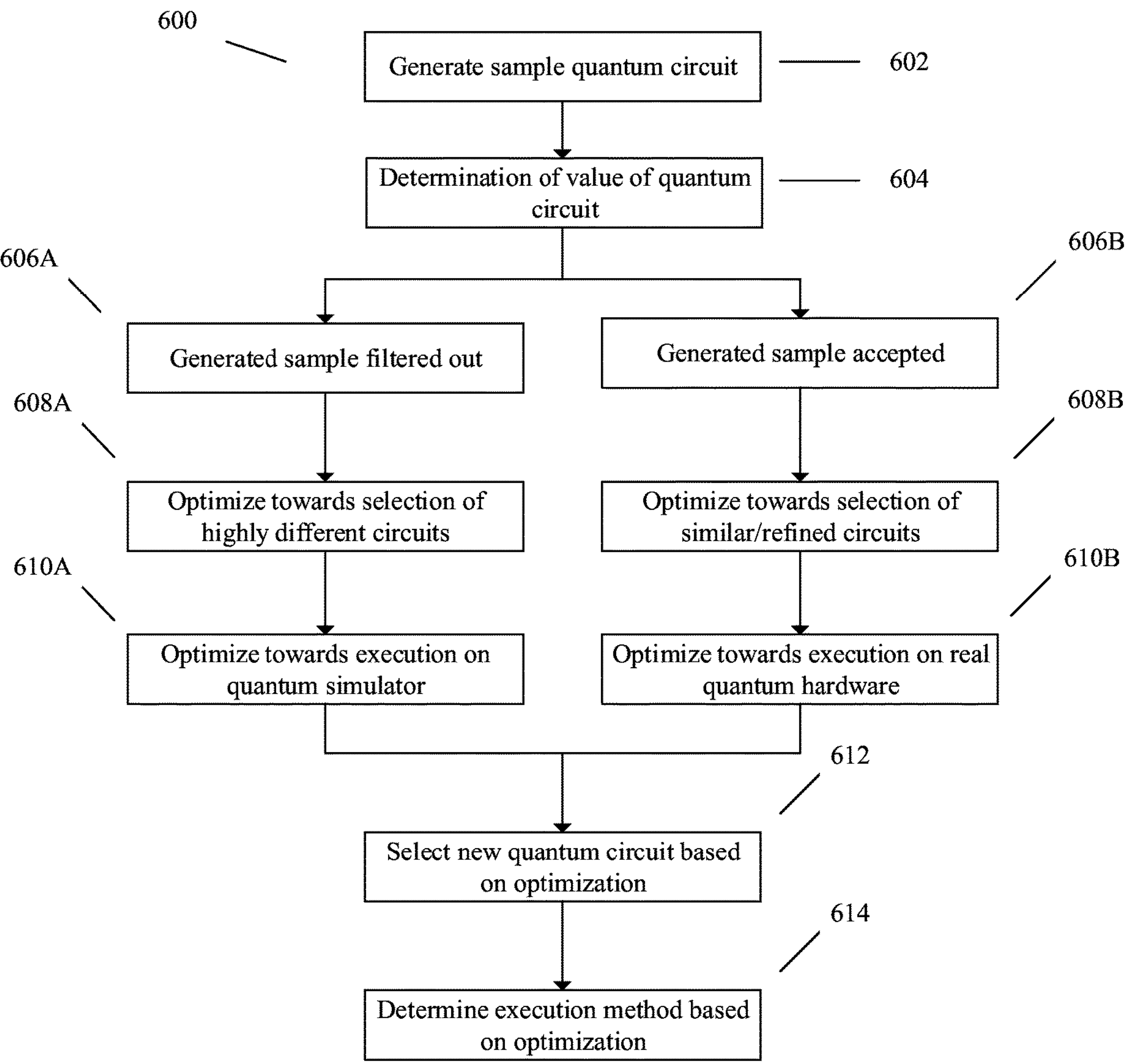
FIG. 6 illustrates a flow diagram of an example, non-limiting computer-implemented method that can facilitate optimization of selection of new quantum circuits in accordance with one or more embodiments described herein.

FIG. 6 illustrates a flow diagram of an example, non-limiting computer-implemented method that can facilitate optimization of selection of new quantum circuits in accordance with one or more embodiments described herein. Repetitive description of like elements and/or processes employed in respective embodiments is omitted for sake of brevity.

At 602, computer-implemented method 600 can comprise generating, by a system (e.g., quantum-enhanced feature optimization system 101 and/or training component 106), a generated quantum circuit to test discriminator 302.

At 604, computer-implemented method 600 can comprise determining, by the system (e.g., quantum-enhanced feature optimization system 101 and/or training component 106), whether the generated quantum circuit has value.

At 606A, computer-implemented method 600 can comprise filtering out, by the system (e.g., quantum-enhanced feature optimization system 101 and/or training component 106), the generated sample in response to a determination that the generated quantum circuit does not has value at step 604.

At 606B, computer-implemented method 600 can comprise accepting, by the system (e.g., quantum-enhanced feature optimization system 101 and/or training component 106), the generated sample in response to a determination that the generated sample has value at step 604.

At 608A, computer-implemented method 600 can comprise optimizing, by the system (e.g., quantum-enhanced feature optimization system 101 and/or training component 106), towards the selection of highly different quantum circuits. For example, in response to the generated sample being filtered out at step 606A, training component 106 can determine that a new quantum circuit with a high degree of difference from a previous quantum circuit and/or the generated sample quantum circuit should be selected next. In another example, training component 106 can determine a random circuit element to include in a new quantum circuit.

At 608B, computer-implemented method 600 can comprise optimizing, by the system (e.g., quantum-enhanced feature optimization system 101 and/or training component 106), towards the selection of highly similar or refined quantum circuits. For example, in response to accepting the generated sample at step 606B, training component 106 can determine that a new quantum circuit that is highly similar to a previous quantum circuit and/or the generated sample quantum circuit should be selected next.

At 610A, computer-implemented method 600 can comprise optimizing, by the system (e.g., quantum-enhanced feature optimization system 101 and/or training component 106), towards the execution of a new quantum circuit on a quantum simulation. For example, training component 106 can generate a probability value of a next quantum circuit being executed on real quantum hardware. As discussed above in reference to FIGS. 1, 2, and 3 executing mapping on real quantum hardware can be expensive and time consuming and executing mapping on a highly different quantum circuit on real quantum hardware creates a risk of executing mapping on a potentially low value quantum circuit on real quantum hardware. As such, if mapping to the highly different quantum circuit is executed on a quantum simulation, risk of wasting real quantum hardware is reduced.

At 610B, computer-implemented method 600 can comprise optimizing, by the system (e.g., quantum-enhanced feature optimization system 101 and/or training component 106), towards the execution of a new quantum circuit on real quantum hardware. As discussed above in reference to FIGS. 1, 2, and 3 if mapping to the highly similar quantum circuit is executed on real quantum hardware, there is reduced risk of wasting real quantum hardware on low value quantum circuits.

At 612, computer-implemented method 600 can comprise selecting, by the system (e.g., quantum-enhanced feature optimization system 101 and/or selection component 104), operatively coupled to a processor (e.g., processor 103), a quantum circuit for mapping a set of classical features to a high-dimensional feature space. For example, if training component 106 optimized towards selection of a highly different quantum circuit at step 608A, selection component 104 can select a new quantum circuit that is highly different from the generated sample quantum circuit and/or a previous quantum circuit. Additionally, selection component 104 can include random circuit elements determined by training component 106 in the new quantum circuit. In another example, if training component 106 optimized towards selection of a highly similar quantum circuit to a previous quantum circuit and/or the generated sample quantum circuit at step 608B, selection component 104 can select a new quantum circuit that is highly similar to a previous quantum circuit and/or the generated sample quantum circuit.

At 614, computer-implemented method 600 can comprise determining, by the system (e.g., quantum-enhanced feature optimization system 101 and/or execution component 105), whether to execute new quantum circuit on real quantum hardware or on a quantum simulation to carry out mapping based on optimization by the training component 106 towards real quantum hardware at step 610*b*, or towards a quantum simulation at step 610A. For example, execution component 105 can receive a probability value that the new quantum circuit should be executed on real quantum hardware or on a quantum simulation. Using this probability value, execution component 105 can determine whether to use real quantum hardware or a quantum simulation.

Figure 7:
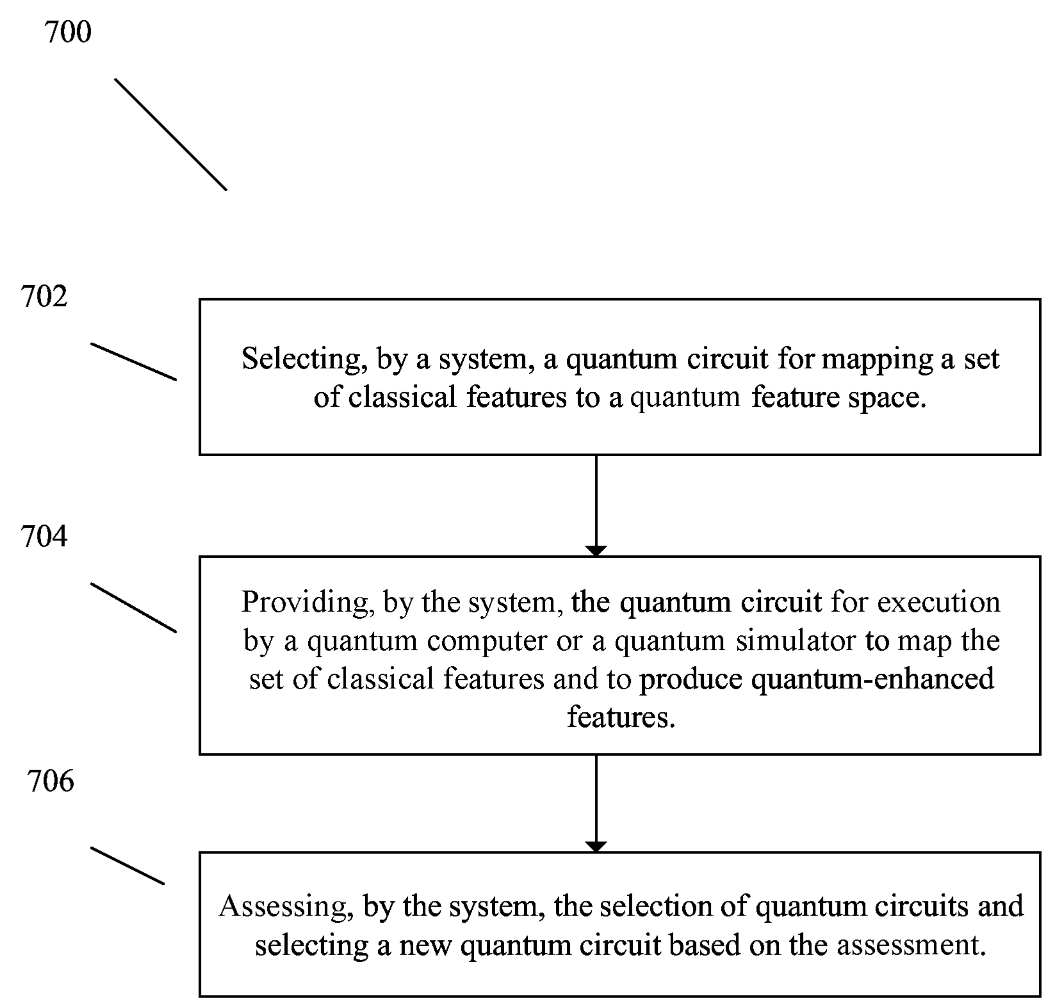
FIG. 7 illustrates a flow diagram of an example, non-limiting computer-implemented method that can facilitate optimization of quantum-enhanced feature generation in accordance with one or more embodiments described herein.

FIG. 7 illustrates a flow diagram of an example, non-limiting computer-implemented method 700 that can facilitate optimization of quantum-enhanced feature generation. Repetitive description of like elements and/or processes employed in respective embodiments is omitted for sake of brevity.

At 702, computer-implemented method 700 can comprise selecting, by a system (e.g., quantum-enhanced feature optimization system 101 and/or selection component 104) operatively coupled to a processor (e.g., processor 103), a quantum circuit for mapping a set of classical features to a high-dimensional feature space. As described above in reference to FIGS. 1 and 2, selection component 104 can select an initial quantum circuit at random or based of a set of input parameters.

At 704, computer-implemented method 700 can comprise executing, by the system (e.g., quantum-enhanced feature optimization system 101 and/or execution component 105 the quantum circuit to map the set of classical features and to produce quantum-enhanced features. As described above in reference to FIGS. 1 and 2, execution component 105 can determine whether to execute the quantum circuit on real quantum hardware or on a quantum simulation.

At 706, computer-implemented method 700 can comprise optimizing, by the system (e.g., quantum-enhanced feature optimization system 101 and/or training component 106), the selection of quantum circuits and selecting a new quantum circuit based on the optimization.

Figure 8:
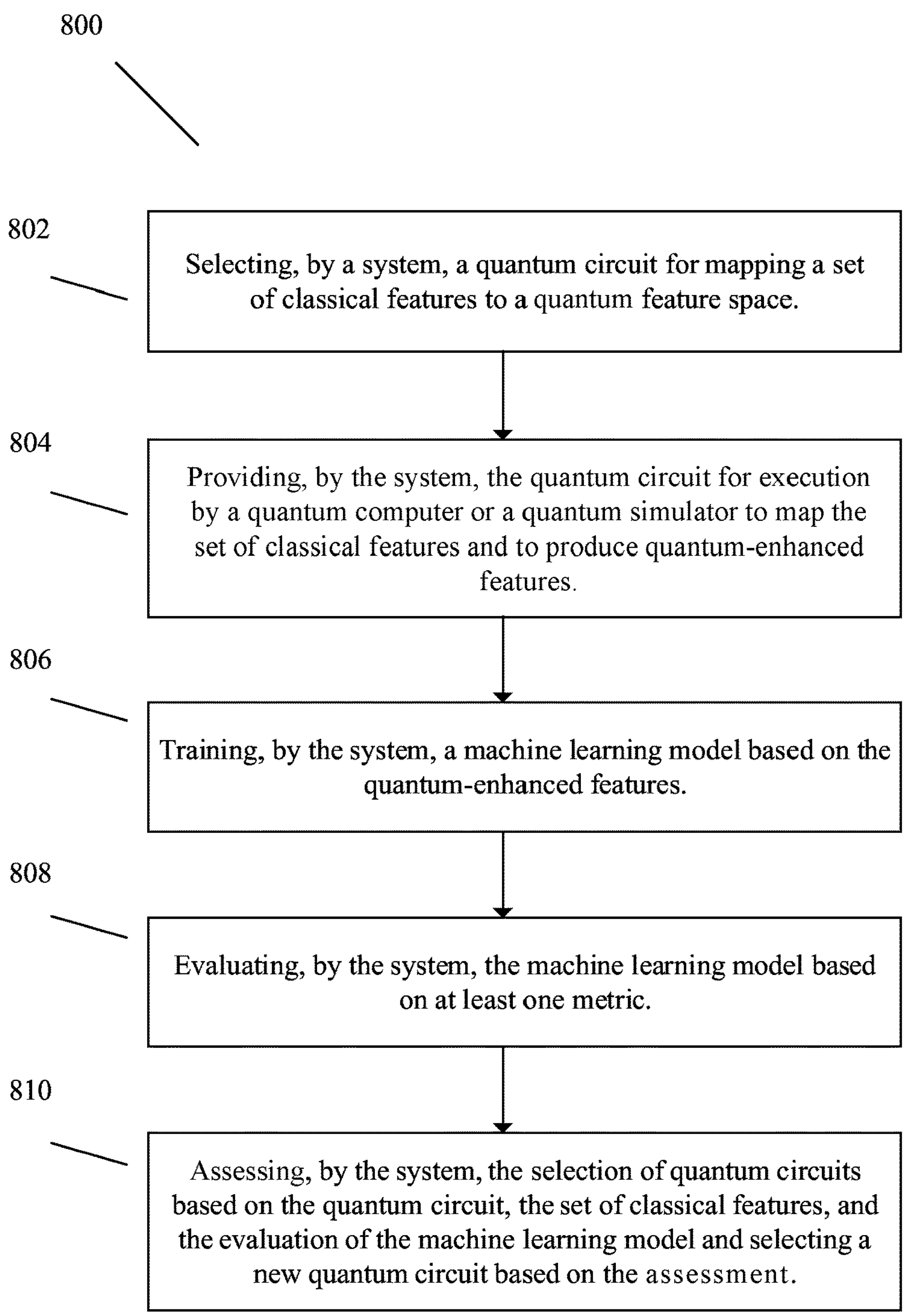
FIG. 8 illustrates a flow diagram of an example, non-limiting computer-implemented method that can facilitate optimization of quantum-enhanced feature generation in accordance with one or more embodiments described herein.

FIG. 8 illustrates a flow diagram of an example, non-limiting computer-implemented method 800 that can facilitate optimization of quantum-enhanced feature generation. Repetitive description of like elements and/or processes employed in respective embodiments is omitted for sake of brevity.

At 802, computer-implemented method 800 can comprise selecting, by a system (e.g., quantum-enhanced feature optimization system 101 and/or selection component 104) operatively coupled to a processor (e.g., processor 103), a quantum circuit for mapping a set of classical features to a high-dimensional feature space.

At 804, computer-implemented method 800 can comprise executing, by the system (e.g., quantum-enhanced feature optimization system 101 and/or execution component 105), the quantum circuit to map the set of classical features and to produce quantum-enhanced features.

At 806, computer-implemented method 800 can comprise training, by the system (e.g., quantum-enhanced feature optimization system 101 and/or model component 207), a machine learning model based on the quantum-enhanced features.

At 808, computer-implemented method 800 can comprise evaluating, by the system, (e.g., quantum-enhanced feature optimization system 101 and/or performance component 208), the machine learning model based on at least one metric. For example, as described above in reference to FIGS. 1 and 2, performance component 208 can evaluate the performance of the machine learning model using an F-score.

At 810, computer-implemented method 800 can comprise optimizing, by the system (e.g., quantum-enhanced feature optimization system 101 and/or training component 106), the selection of quantum circuits based on the quantum circuit, the set of classical features, and the evaluation of the machine learning model and selecting a new quantum circuit based on the optimization.

Figure 9:
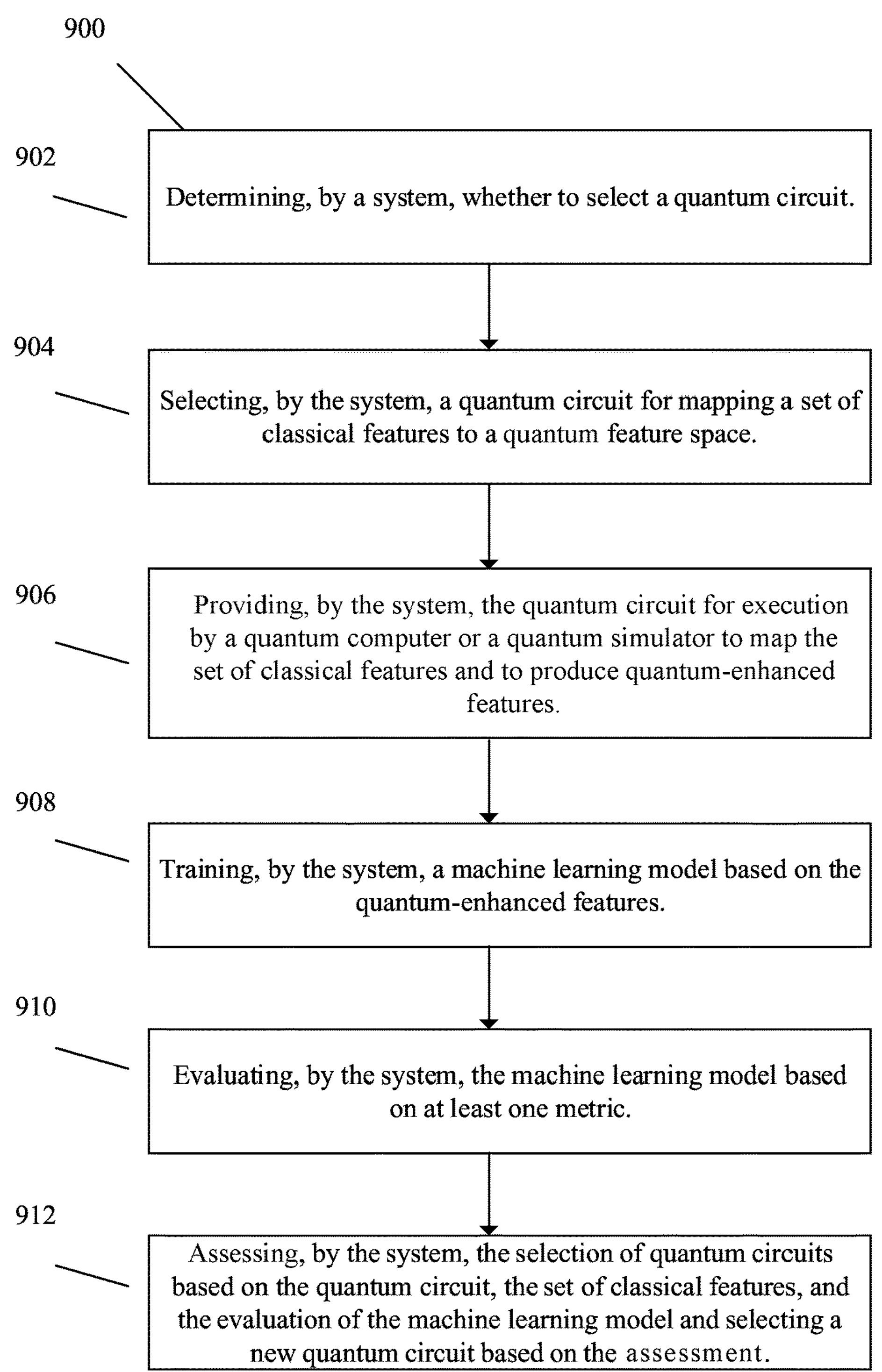
FIG. 9 illustrates a flow diagram of an example, non-limiting computer-implemented method that can facilitate optimization of quantum-enhanced feature generation in accordance with one or more embodiments described herein.

FIG. 9 illustrates a flow diagram of an example, non-limiting computer-implemented method 900 that can facilitate optimization of quantum-enhanced feature generation. Repetitive description of like elements and/or processes employed in respective embodiments is omitted for sake of brevity.

At 902, computer-implemented method 900 can comprise determining, by the system (e.g., quantum-enhanced feature optimization system 101 and/or selection component 104) operatively coupled to a processor (e.g., processor 103), whether to select a quantum circuit. For example, as described above in reference to FIGS. 1 and 2, selection component 104 can use an F-score of the performance of a classically trained machine learning model to determine whether to employ quantum-enhanced feature generation.

At 904, computer-implemented method 900 can comprise selecting, by a system (e.g., quantum-enhanced feature optimization system 101 and/or selection component 104), operatively coupled to a processor (e.g., processor 103), a quantum circuit for mapping a set of classical features to a high-dimensional feature space.

At 906, computer-implemented method 900 can comprise executing, by the system (e.g., quantum-enhanced feature optimization system 101 and/or execution component 105), the quantum circuit to map the set of classical features and to produce quantum-enhanced features.

At 908, computer-implemented method 900 can comprise training, by the system (e.g., quantum-enhanced feature optimization system 101 and/or model component 207), a machine learning model based on the quantum-enhanced features.

At 910, computer-implemented method 900 can comprise evaluating, by the system (e.g., quantum-enhanced feature optimization system 101 and/or performance component 209), the machine learning model based on at least one metric. For example, as described above in reference to FIGS. 1 and 2, performance component 209 can evaluate the machine learning model based on desirable model characteristics, such as minimal bias criteria.

At 912, computer-implemented method 900 can comprise optimizing, by the system (e.g., quantum-enhanced feature optimization system 101 and/or training component 106), the selection of quantum circuits based on the quantum circuit, the set of classical features, and the evaluation of the machine learning model and selecting a new quantum circuit based on the optimization.

Quantum-enhanced feature optimization system 101 can provide technical improvements to a processing unit associated with quantum-enhanced feature optimization system 101. For example, in optimizing the selection of quantum circuits, quantum-enhanced feature optimization system 101 can train the above described machine learning model with fewer iterations as the selection of new quantum circuits is based on the performance of the machine learning model, thereby reducing the workload of a processing unit (e.g., processor 103) that is employed to execute the routines (e.g., instructions and/or processing threads) of such training process. In this example, by reducing the workload of such a processing unit (e.g., processor 103), quantum-enhanced feature optimization system 101 can thereby facilitate improved performance, improved efficiency, and/or reduced computational cost associated with such a processing unit. Moreover, these advantages can also result in additional benefits of reducing computational workload at the quantum computer and associated cost due to improved selection of quantum circuits themselves for execution by the quantum computer, whether relating to, e.g., training or execution of a classical machine learning model and/or a quantum machine learning model.

Quantum-enhanced feature optimization system 101 can employ hardware or software to solve problems that are highly technical in nature, that are not abstract and that cannot be performed as a set of mental acts by a human. In some embodiments, one or more of the processes described herein can be performed by one or more specialized computers (e.g., a specialized processing unit, a specialized classical computer, a specialized quantum computer, and/or another type of specialized computer) to execute defined tasks related to the various technologies identified above. Quantum-enhanced feature optimization system 101 and/or components thereof, can be employed to solve new problems that arise through advancements in technologies such as machine learning, employment of quantum computing systems, cloud computing systems, computer architecture, and/or another technology.

It is to be appreciated that quantum-enhanced feature optimization system 101 can utilize various combinations of electrical components, mechanical components, and circuitry that cannot be replicated in the mind of a human or performed by a human, as the various operations that can be executed by quantum-enhanced feature optimization system 101 and/or components thereof as described herein are operations that are greater than the capability of a human mind. For instance, the amount of data processed, the speed of processing such data, or the types of data processed by quantum-enhanced feature optimization system 101 over a certain period of time can be greater, faster, or different that the amount, speed, or data type that can be processed by a human mind over the same period of time.

According to several embodiments, quantum-enhanced feature optimization system 101 can also be fully operational towards performing one or more other functions (e.g., fully powered on, fully executed, and/or another function) while also performing the various operations described herein. It should be appreciated that such simultaneous multi-operational execution is beyond the capability of a human mind. It should also be appreciated that quantum-enhanced feature optimization system 101 can include information that is impossible to obtain manually by an entity, such as a human user. For example, the type, amount, and/or variety of information included in quantum-enhanced feature optimization system 101 selection component 104, execution component 105, training component 106, model component 207, and/or performance component 208 can be more complex than information obtained manually by an entity, such as a human user.

For simplicity of explanation, the computer-implemented methodologies are depicted and described as a series of acts. It is to be understood and appreciated that the subject innovation is not limited by the acts illustrated and/or by the order of acts, for example acts can occur in various orders and/or concurrently, and with other acts not presented and described herein. Furthermore, not all illustrated acts can be required to implement the computer-implemented methodologies in accordance with the disclosed subject matter. In addition, those skilled in the art will understand and appreciate that the computer-implemented methodologies could alternatively be represented as a series of interrelated states via a state diagram or events. Additionally, it should be further appreciated that the computer-implemented methodologies disclosed hereinafter and throughout this specification are capable of being stored on an article of manufacture to facilitate transporting and transferring such computer-implemented methodologies to computers. The term article of manufacture, as used herein, is intended to encompass a computer program accessible from any computer-readable device or storage media.

Figure 10:
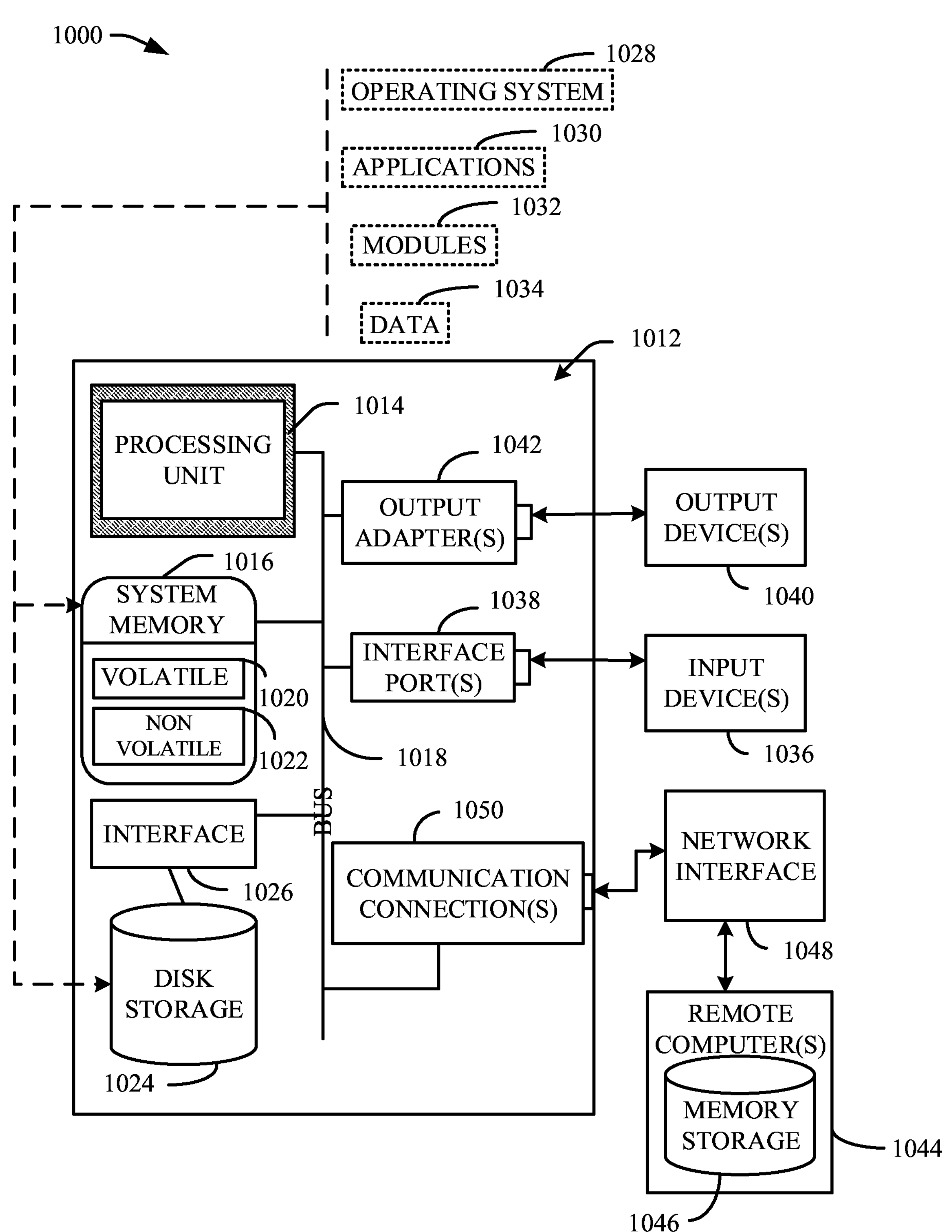
FIG. 10 illustrates a block diagram of an example, non-limiting operating environment in which one or more embodiments described herein can be facilitated.

In order to provide a context for the various aspects of the disclosed subject matter, FIG. 10 as well as the following discussion are intended to provide a general description of a suitable environment in which the various aspects of the disclosed subject matter can be implemented. FIG. 10 illustrates a block diagram of an example, non-limiting operating environment in which one or more embodiments described herein can be facilitated. Repetitive description of like elements employed in other embodiments described herein is omitted for sake of brevity.

With reference to FIG. 10, a suitable operating environment 1000 for implementing various aspects of this disclosure can also include a computer 1012. The computer 1012 can also include a processing unit 1014, a system memory 1016, and a system bus 1018. The system bus 1018 couples system components including, but not limited to, the system memory 1016 to the processing unit 1014. The processing unit 1014 can be any of various available processors. Dual microprocessors and other multiprocessor architectures also can be employed as the processing unit 1014. The system bus 1018 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Firewire (IEEE 1394), and Small Computer Systems Interface (SCSI).

The system memory 1016 can also include volatile memory 1020 and nonvolatile memory 1022. The basic input/output system (BIOS), containing the basic routines to transfer information between elements within the computer 1012, such as during start-up, is stored in nonvolatile memory 1022. Computer 812 can also include removable/non-removable, volatile/non-volatile computer storage media. FIG. 10 illustrates, for example, a disk storage 1024. Disk storage 1024 can also include, but is not limited to, devices like a magnetic disk drive, floppy disk drive, tape drive, Jaz drive, Zip drive, LS-100 drive, flash memory card, or memory stick. The disk storage 1024 also can include storage media separately or in combination with other storage media. To facilitate connection of the disk storage 1024 to the system bus 1018, a removable or non-removable interface is typically used, such as interface 1026. FIG. 10 also depicts software that acts as an intermediary between users and the basic computer resources described in the suitable operating environment 1000. Such software can also include, for example, an operating system 1028. Operating system 1028, which can be stored on disk storage 1024, acts to control and allocate resources of the computer 1012.

System applications 1030 take advantage of the management of resources by operating system 1028 through program modules 1032 and program data 1034, e.g., stored either in system memory 1016 or on disk storage 1024. It is to be appreciated that this disclosure can be implemented with various operating systems or combinations of operating systems. A user enters commands or information into the computer 1012 through input device(s) 1036. Input devices 1036 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1014 through the system bus 1018 via interface port(s) 1038. Interface port(s) 1038 include, for example, a serial port, a parallel port, a game port, and a universal serial bus (USB). Output device(s) 1040 use some of the same type of ports as input device(s) 1036. Thus, for example, a USB port can be used to provide input to computer 1012, and to output information from computer 1012 to an output device 1040. Output adapter 1042 is provided to illustrate that there are some output devices 1040 like monitors, speakers, and printers, among other output devices 1040, which require special adapters. The output adapters 1042 include, by way of illustration and not limitation, video and sound cards that provide a means of connection between the output device 1040 and the system bus 1018. It should be noted that other devices and/or systems of devices provide both input and output capabilities such as remote computer(s) 844.

Computer 1012 can operate in a networked environment using logical connections to one or more remote computers, such as remote computer(s) 1044. The remote computer(s) 1044 can be a computer, a server, a router, a network PC, a workstation, a microprocessor based appliance, a peer device or other common network node and the like, and typically can also include many or all of the elements described relative to computer 1012. For purposes of brevity, only a memory storage device 1046 is illustrated with remote computer(s) 1044. Remote computer(s) 1044 is logically connected to computer 1012 through a network interface 1048 and then physically connected via communication connection 1050. Network interface 1048 encompasses wire and/or wireless communication networks such as local-area networks (LAN), wide-area networks (WAN), cellular networks, and/or another wire and/or wireless communication network. LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL). Communication connection(s) 1050 refers to the hardware/software employed to connect the network interface 1048 to the system bus 1018. While communication connection 1050 is shown for illustrative clarity inside computer 1012, it can also be external to computer 1012. The hardware/software for connection to the network interface 1048 can also include, for exemplary purposes only, internal and external technologies such as, modems including regular telephone grade modems, cable modems and DSL modems, ISDN adapters, and Ethernet cards.

The present invention may be a system, a method, an apparatus and/or a computer program product at any possible technical detail level of integration. The computer program product can include a computer readable storage medium (or media) having computer readable program instructions thereon for causing a processor to carry out aspects of the present invention. The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium can also include the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device. Computer readable program instructions for carrying out operations of the present invention can be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions. These computer readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks. The computer readable program instructions can also be loaded onto a computer, other programmable data processing apparatus, or other device to cause a series of operational acts to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams can represent a module, segment, or portion of instructions, which comprises one or more executable instructions for implementing the specified logical function(s). In some alternative implementations, the functions noted in the blocks can occur out of the order noted in the Figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the subject matter has been described above in the general context of computer-executable instructions of a computer program product that runs on a computer and/or computers, those skilled in the art will recognize that this disclosure also can or can be implemented in combination with other program modules. Generally, program modules include routines, programs, components, data structures, and/or other program modules that perform particular tasks and/or implement particular abstract data types. Moreover, those skilled in the art will appreciate that the inventive computer-implemented methods can be practiced with other computer system configurations, including single-processor or multiprocessor computer systems, mini-computing devices, mainframe computers, as well as computers, hand-held computing devices (e.g., PDA, phone), microprocessor-based or programmable consumer or industrial electronics, and the like. The illustrated aspects can also be practiced in distributed computing environments in which tasks are performed by remote processing devices that are linked through a communications network. However, some, if not all aspects of this disclosure can be practiced on stand-alone computers. In a distributed computing environment, program modules can be located in both local and remote memory storage devices. For example, in one or more embodiments, computer executable components can be executed from memory that can include or be comprised of one or more distributed memory units. As used herein, the term "memory" and "memory unit" are interchangeable. Further, one or more embodiments described herein can execute code of the computer executable components in a distributed manner, e.g., multiple processors combining or working cooperatively to execute code from one or more distributed memory units. As used herein, the term "memory" can encompass a single memory or memory unit at one location or multiple memories or memory units at one or more locations.

As used in this application, the terms "component," "system," "platform," "interface," and the like, can refer to and/or can include a computer-related entity or an entity related to an operational machine with one or more specific functionalities. The entities disclosed herein can be either hardware, a combination of hardware and software, software, or software in execution. For example, a component can be, but is not limited to being, a process running on a processor, a processor, an object, an executable, a thread of execution, a program, and/or a computer. By way of illustration, both an application running on a server and the server can be a component. One or more components can reside within a process and/or thread of execution and a component can be localized on one computer and/or distributed between two or more computers. In another example, respective components can execute from various computer readable media having various data structures stored thereon. The components can communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor. In such a case, the processor can be internal or external to the apparatus and can execute at least a part of the software or firmware application. As yet another example, a component can be an apparatus that provides specific functionality through electronic components without mechanical parts, where the electronic components can include a processor or other means to execute software or firmware that confers at least in part the functionality of the electronic components. In an aspect, a component can emulate an electronic component via a virtual machine, e.g., within a cloud computing system.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form. As used herein, the terms "example" and/or "exemplary" are utilized to mean serving as an example, instance, or illustration. For the avoidance of doubt, the subject matter disclosed herein is not limited by such examples. In addition, any aspect or design described herein as an "example" and/or "exemplary" is not necessarily to be construed as preferred or advantageous over other aspects or designs, nor is it meant to preclude equivalent exemplary structures and techniques known to those of ordinary skill in the art.

As it is employed in the subject specification, the term "processor" can refer to substantially any computing processing unit or device comprising, but not limited to, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Further, processors can exploit nano-scale architectures such as, but not limited to, molecular and quantum-dot based transistors, switches and gates, in order to optimize space usage or enhance performance of user equipment. A processor can also be implemented as a combination of computing processing units. In this disclosure, terms such as "store," "storage," "data store," data storage," "database," and substantially any other information storage component relevant to operation and functionality of a component are utilized to refer to "memory components," entities embodied in a "memory," or components comprising a memory. It is to be appreciated that memory and/or memory components described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), flash memory, or nonvolatile random access memory (RAM) (e.g., ferroelectric RAM (FeRAM). Volatile memory can include RAM, which can act as external cache memory, for example. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM (RDRAM). Additionally, the disclosed memory components of systems or computer-implemented methods herein are intended to include, without being limited to including, these and any other suitable types of memory.

What has been described above include mere examples of systems and computer-implemented methods. It is, of course, not possible to describe every conceivable combination of components or computer-implemented methods for purposes of describing this disclosure, but one of ordinary skill in the art can recognize that many further combinations and permutations of this disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system comprising:

a memory that stores computer executable components;

a processor that executes at least one of the computer executable components that:

trains a machine learning model to perform a defined task, wherein the training comprises:

performing a quantum circuit selection of a quantum circuit from a set of quantum circuits for mapping a set of classical features to a quantum feature space;

determining whether to execute the quantum circuit on a quantum computer using a quantum processor or a quantum simulator using a classical processor based on at least one characteristic of the quantum circuit to minimize usage of quantum resources of the quantum computer while meeting a defined performance metric associated with the quantum circuit selection, wherein the determining comprises:

evaluating the at least one characteristic of the quantum circuit with respect to executing the quantum circuit on the quantum computer, evaluating the at least one characteristic of the quantum circuit with respect to executing the quantum circuit on the quantum simulator, and in response to determining, based on the evaluations associated with the quantum circuit, that executing the quantum circuit on the quantum simulator is preferable over executing the quantum circuit on the quantum computer according to a first defined criterion, executing the quantum circuit, using the quantum simulator, to map the set of classical features to the quantum feature space to produce quantum-enhanced features, or in response to determining, based on the evaluations associated with the quantum circuit, that executing the quantum circuit on the quantum simulator is not preferable over executing the quantum circuit on the quantum computer according to the first defined criterion, executing the quantum circuit, using the quantum computer, to map the set of classical features to the quantum feature space to produce the quantum-enhanced features;

training, using the quantum-enhanced features, the machine learning model to perform the defined task;

assessing the quantum circuit selection based on an output of the machine learning model in performing the defined task using the quantum-enhanced features, and iteratively performing until a result of the assessing of the quantum circuit selection meets a second defined criterion:

based on the result of the assessing, performing the quantum circuit selection of another quantum circuit from the set of quantum circuits for mapping the set of classical features to the quantum feature space, wherein the selected other quantum circuit is different from quantum circuits previously selected;

determining whether to execute the selected other quantum circuit on the quantum computer or the quantum simulator based on the at least one characteristic of the selected other quantum circuit to minimize the usage of the quantum resources while meeting the defined performance metric associated with the quantum circuit selection, wherein the determining comprises:

evaluating the at least one characteristic of the selected other quantum circuit with respect to executing the selected other quantum circuit on the quantum computer, evaluating the at least one characteristic of the selected other quantum circuit with respect to executing the selected other quantum circuit on the quantum simulator, and in response to determining, based on the evaluations associated with the selected other quantum circuit, that executing the selected other quantum circuit on the quantum simulator is preferable over executing the selected other quantum circuit on the quantum computer according to the first defined criterion, executing the selected other quantum circuit, using the quantum simulator, to map the set of classical features to the quantum feature space to produce updated quantum-enhanced features, or in response to determining, based on the evaluations associated with the selected other quantum circuit, that executing the selected other quantum circuit on the quantum simulator is not preferable over executing the selected other quantum circuit on the quantum computer according to the first defined criterion, executing the selected other quantum circuit, using the quantum computer, to map the set of classical features to the quantum feature space to produce the quantum-enhanced features;

training, using the updated quantum-enhanced features, the machine learning model to perform the defined task; and assessing the quantum circuit selection based on another output of the machine learning model in performing the defined task using the updated quantum-enhanced features.

2. The system of claim 1, wherein the quantum circuit selection is based on respective complexities of the quantum circuits in the set of quantum circuits.

3. The system of claim 2, wherein the respective complexities are based at least on respective widths of the quantum circuits in the set of quantum circuits.

4. The system of claim 2, wherein the respective complexities are based at least on respective depths of the quantum circuits in the set of quantum circuits.

5. The system of claim 1, wherein the machine learning model comprises at least one of a generative adversarial network model or a reinforcement learning model.

6. The system of claim 1, wherein the quantum circuit selection is based on randomly introducing new quantum circuit elements.

7. The system of claim 1, wherein the quantum circuit selection comprises carrying out a selection optimization that decreases requirements placed on the quantum resources through additional penalty terms that help minimize at least one of required number of qubits, qubit connectivity, fidelity, number of quantum gates, number of quantum control gates, number of multi-qubit gates, or size of a Hilbert space.

8. A computer-implemented method, comprising:

training, by a system operatively coupled to a processor, a machine learning model to perform a defined task, wherein the training comprises:

performing a quantum circuit selection of a quantum circuit from a set of quantum circuits for mapping a set of classical features to a quantum feature space;

determining whether to execute the quantum circuit on a quantum computer using a quantum processor or a quantum simulator using a classical processor based on at least one characteristic of the quantum circuit to minimize usage of quantum resources of the quantum computer while meeting a defined performance metric associated with the quantum circuit selection, wherein the determining comprises:

evaluating the at least one characteristic of the quantum circuit with respect to executing the quantum circuit on the quantum computer, evaluating the at least one characteristic of the quantum circuit with respect to executing the quantum circuit on the quantum simulator, and in response to determining, based on the evaluations associated with the quantum circuit, that executing the quantum circuit on the quantum simulator is preferable over executing the quantum circuit on the quantum computer according to a first defined criterion, executing the quantum circuit, using the quantum simulator, to map the set of classical features to the quantum feature space to produce quantum-enhanced features, or in response to determining, based on the evaluations associated with the quantum circuit, that executing the quantum circuit on the quantum simulator is not preferable over executing the quantum circuit on the quantum computer according to the first defined criterion, executing the quantum circuit, using the quantum computer, to map the set of classical features to the quantum feature space to produce the quantum-enhanced features;

training, using the quantum-enhanced features, the machine learning model to perform the defined task;

assessing the quantum circuit selection based on an output of the machine learning model in performing the defined task using the quantum-enhanced features, and iteratively performing until a result of the assessing of the quantum circuit selection meets a second defined criterion:

based on the result of the assessing, performing the quantum circuit selection of another quantum circuit from the set of quantum circuits for mapping the set of classical features to the quantum feature space, wherein the selected other quantum circuit is different from quantum circuits previously selected;

determining whether to execute the selected other quantum circuit on the quantum computer or the quantum simulator based on the at least one characteristic of the selected other quantum circuit to minimize the usage of the quantum resources while meeting the defined performance metric associated with the quantum circuit selection, wherein the determining comprises:

evaluating the at least one characteristic of the selected other quantum circuit with respect to executing the selected other quantum circuit on the quantum computer, evaluating the at least one characteristic of the selected other quantum circuit with respect to executing the selected other quantum circuit on the quantum simulator, and in response to determining, based on the evaluations associated with the selected other quantum circuit, that executing the selected other quantum circuit on the quantum simulator is preferable over executing the selected other quantum circuit on the quantum computer according to the first defined criterion, executing the selected other quantum circuit, using the quantum simulator, to map the set of classical features to the quantum feature space to produce updated quantum-enhanced features, or in response to determining, based on the evaluations associated with the selected other quantum circuit, that executing the selected other quantum circuit on the quantum simulator is not preferable over executing the selected other quantum circuit on the quantum computer according to the first defined criterion, executing the selected other quantum circuit, using the quantum computer, to map the set of classical features to the quantum feature space to produce the quantum-enhanced features;

training, using the updated quantum-enhanced features, the machine learning model to perform the defined task; and assessing the quantum circuit selection based on another output of the machine learning model in performing the defined task using the updated quantum-enhanced features.

9. The computer-implemented method of claim 8, wherein the quantum circuit selection is based on respective complexities of the quantum circuits in the set of quantum circuits.

10. The computer-implemented method of claim 9, wherein the respective complexities are based at least on respective widths of the quantum circuits in the set of quantum circuits.

11. The computer-implemented method of claim 9, wherein the respective complexities are based at least on respective depths of the quantum circuits in the set of quantum circuits.

12. The computer-implemented method of claim 8, wherein the machine learning model comprises at least one of a generative adversarial network model or a reinforcement learning model.

13. The computer-implemented method of claim 8, wherein the quantum circuit selection is based on randomly introducing new quantum circuit elements.

14. The computer-implemented method of claim 8, wherein the quantum circuit selection comprises carrying out a selection optimization that decreases requirements placed on the quantum resources through additional penalty terms that help minimize at least one out of required number of qubits, qubit connectivity, fidelity, number of quantum gates, number of quantum control gates, number of multi-qubit gates, or size of a Hilbert space.

15. A computer program product comprising a computer readable storage medium having program instructions embodied therewith, the program instructions executable by a processor to cause the processor to:

train a machine learning model to perform a defined task, wherein the training comprises:

performing a quantum circuit selection of a quantum circuit from a set of quantum circuits for mapping a set of classical features to a quantum feature space;

determining whether to execute the quantum circuit on a quantum computer using a quantum processor or a quantum simulator using a classical processor based on at least one characteristic of the quantum circuit to minimize usage of quantum resources of the quantum computer while meeting a defined performance metric associated with the quantum circuit selection, wherein the determining comprises:

evaluating the at least one characteristic of the quantum circuit with respect to executing the quantum circuit on the quantum computer, evaluating the at least one characteristic of the quantum circuit with respect to executing the quantum circuit on the quantum simulator, and in response to determining, based on the evaluations associated with the quantum circuit, that executing the quantum circuit on the quantum simulator is preferable over executing the quantum circuit on the quantum computer according to a defined criterion, executing the quantum circuit, using the quantum simulator, to map the set of classical features to the quantum feature space to produce quantum-enhanced features, or in response to determining, based on the evaluations associated with the quantum circuit, that executing the quantum circuit on the quantum simulator is not preferable over executing the quantum circuit on the quantum computer according to the defined criterion, executing the quantum circuit, using the quantum computer, to map the set of classical features to the quantum feature space to produce the quantum-enhanced features;

training, using the quantum-enhanced features, the machine learning model to perform the defined task;

assessing the quantum circuit selection based on an output of the machine learning model in performing the defined task using the quantum-enhanced features, and iteratively performing until a result of the assessing of the quantum circuit selection meets a second defined criterion:

based on the result of the assessing, performing a quantum circuit selection of another quantum circuit from the set of quantum circuits for mapping the set of classical features to the quantum feature space, wherein the selected other quantum circuit is different from quantum circuits previously selected;

determining whether to execute the selected other quantum circuit on the quantum computer or the quantum simulator based on the at least one characteristic of the selected other quantum circuit to minimize the usage of the quantum resources while meeting the defined performance metric associated with the quantum circuit selection, wherein the determining comprises:

evaluating the at least one characteristic of the selected other quantum circuit with respect to executing the selected other quantum circuit on the quantum computer, evaluating the at least one characteristic of the selected other quantum circuit with respect to executing the selected other quantum circuit on the quantum simulator, and in response to determining, based on the evaluations associated with the selected other quantum circuit, that executing the selected other quantum circuit on the quantum simulator is preferable over executing the selected other quantum circuit on the quantum computer according to the defined criterion, executing the selected other quantum circuit, using the quantum simulator, to map the set of classical features to the quantum feature space to produce updated quantum-enhanced features, or in response to determining, based on the evaluations associated with the selected other quantum circuit, that executing the selected other quantum circuit on the quantum simulator is not preferable over executing the selected other quantum circuit on the quantum computer according to the defined criterion, executing the selected other quantum circuit, using the quantum computer, to map the set of classical features to the quantum feature space to produce the quantum-enhanced features;

training, using the updated quantum-enhanced features, the machine learning model to perform the defined task; and assessing the quantum circuit selection based on another output of the machine learning model in performing the defined task using the updated quantum-enhanced features.

16. The computer program product of claim 15, wherein the quantum circuit selection is based on respective complexities of the quantum circuits in the set of quantum circuits.

17. The computer program product of claim 16, wherein the respective complexities are based at least on respective widths of the quantum circuits in the set of quantum circuits.

18. The computer program product of claim 16, wherein the respective complexities are based at least on respective depths of the quantum circuits in the set of quantum circuits.

19. The computer program product of claim 15, wherein the machine learning model comprises at least one of a generative adversarial network model or a reinforcement learning model.

20. The computer program product of claim 15, wherein the quantum circuit selection is based on randomly introducing new quantum circuit elements.

* * * * *